(12) United States Patent
Liu et al.

(10) Patent No.: US 11,153,892 B2
(45) Date of Patent: *Oct. 19, 2021

(54) CSI-RS SCRAMBLING OF SUBFRAMES IN A MULTI-SUBFRAME DRS

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,782

(22) Filed: May 8, 2020

(65) Prior Publication Data
US 2020/0344775 A1 Oct. 29, 2020

Related U.S. Application Data

(63) Continuation of application No. 16/134,534, filed on Sep. 18, 2018, now Pat. No. 10,652,914.

(Continued)

(51) Int. Cl.
*H04W 72/12* (2009.01)
*H04L 5/00* (2006.01)
(Continued)

(52) U.S. Cl.
CPC ......... *H04W 72/1215* (2013.01); *H04L 5/005* (2013.01); *H04L 5/001* (2013.01);
(Continued)

(58) Field of Classification Search
CPC ..... H04L 5/001; H04L 5/005; H04L 27/0006; H04W 16/14; H04W 74/0808; H04W 72/1215; H04W 72/1226
See application file for complete search history.

(56) References Cited

U.S. PATENT DOCUMENTS 10,652,914 B2 * 5/2020 Liu .................. H04L 5/005
2015/0312784 A1 10/2015 You et al.
(Continued)

OTHER PUBLICATIONS

International Search Report and Written Opinion—PCT/US2018/051893—ISA/EPO—dated Dec. 19, 2018.

*Primary Examiner* — Benjamin H Elliott, IV
(74) *Attorney, Agent, or Firm* — Muncy, Geissler, Olds & Lowe, P.C./Qualcomm

(57) ABSTRACT

In an embodiment, an AP executes a CCA protocol to determine whether to begin transmission within a DMTC window of a radio frame having first and second blocks of subframes. The AP transmits a multi-subframe DRS within the DRS subframes that is scrambled in accordance with a CSI-RS scrambling rule that determines how the second DRS subframe is to be scrambled based on whether the first DRS subframe is included among the first block of subframes or the second block of subframes. At least one UE monitors the DMTC window, and descrambles the CSI-RSs in the multi-DRS subframe based on a CSI-RS descrambling rule that determines how the second DRS subframe is to be descrambled based on whether the first DRS subframe is included among the first block of subframes or the second block of subframes.

28 Claims, 11 Drawing Sheets

Related U.S. Application Data

(60) Provisional application No. 62/561,186, filed on Sep. 20, 2017.

(51) Int. Cl.
 *H04W 16/14* (2009.01)
 *H04W 74/08* (2009.01)
 *H04L 27/00* (2006.01)

(52) U.S. Cl.
 CPC ......... *H04L 27/0006* (2013.01); *H04W 16/14* (2013.01); *H04W 72/1226* (2013.01); *H04W 74/0808* (2013.01)

(56) References Cited

U.S. PATENT DOCUMENTS

| | | | |
|---|---|---|---|
| 2016/0073366 A1* | 3/2016 | Ng | H04W 16/14 370/329 |
| 2016/0127095 A1 | 5/2016 | Chen et al. | |
| 2016/0227428 A1 | 8/2016 | Novlan et al. | |
| 2017/0070312 A1 | 3/2017 | Yi et al. | |
| 2017/0078953 A1 | 3/2017 | You et al. | |
| 2017/0134148 A1 | 5/2017 | Yerramalli et al. | |
| 2017/0164247 A1 | 6/2017 | Wiemann et al. | |
| 2017/0223558 A1* | 8/2017 | Deng | H04W 24/10 |
| 2017/0223686 A1 | 8/2017 | You et al. | |
| 2017/0257785 A1 | 9/2017 | Henttonen et al. | |
| 2017/0276761 A1 | 9/2017 | Park et al. | |
| 2018/0213561 A1* | 7/2018 | Bhorkar | H04W 72/044 |
| 2018/0220459 A1 | 8/2018 | Park et al. | |
| 2018/0302195 A1 | 10/2018 | Kim et al. | |
| 2018/0368034 A1* | 12/2018 | Lin | H04L 5/0057 |
| 2018/0368035 A1* | 12/2018 | Huang | H04W 72/046 |
| 2018/0376343 A1 | 12/2018 | Harada et al. | |
| 2019/0007933 A1 | 1/2019 | Yi et al. | |
| 2019/0089485 A1* | 3/2019 | Yun | H04W 76/11 |
| 2020/0344775 A1* | 10/2020 | Liu | H04L 5/005 |

* cited by examiner

CSI-RS SCRAMBLING OF SUBFRAMES IN A MULTI-SUBFRAME DRS

CROSS-REFERENCE TO RELATED APPLICATION

The present Application for Patent is a Continuation of U.S. Non-Provisional application Ser. No. 16/134,534, entitled "CSI-RS SCRAMBLING OF SUBFRAMES IN A MULTI-SUBFRAME DRS", filed Sep. 18, 2018, which in turn claims the benefit of U.S. Provisional Application No. 62/561,186, entitled "CSI-RS SCRAMBLING IN DRS FOR MULTEFIRE COVERAGE ENHANCEMENT", filed Sep. 20, 2017, each of which is assigned to the assignee hereof and hereby expressly incorporated by reference herein in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may need to coexist with the operations of other Radio Access Technologies (RATs) that typically utilize the same unlicensed bands, most notably IEEE 802.11x WLAN technologies generally referred to as "Wi-Fi."

SUMMARY

An embodiment is directed to a method of configuring channel state information reference signals (CSI-RSs) on a shared communication medium, comprising executing a Clear Channel Assessment (CCA) protocol to determine whether to begin transmission within a Discovery Reference Signaling (DRS) Measurement Timing Configuration (DMTC) window of a Radio Frame that includes a first block of subframes and a second block of subframes, transmitting, based on the executing, a multi-subframe DRS within the DMTC window, the multi-subframe DRS including a plurality of DRS subframes that each include a plurality of symbols, and scrambling CSI-RSs in first and second DRS subframes of the multi-subframe DRS in accordance with a CSI-RS scrambling rule that determines how the second DRS subframe is to be scrambled based on whether the first DRS subframe is included among the first block of subframes or the second block of subframes.

Another embodiment of the disclosure is directed to a method of obtaining channel state information reference signals (CSI-RSs) on a shared communication medium, comprising monitoring a Discovery Reference Signaling (DRS) Measurement Timing Configuration (DMTC) window of a Radio Frame that includes a first block of subframes and a second block of subframes, receiving, based on the monitoring, a multi-subframe DRS within the DMTC window, the multi-subframe DRS including a plurality of DRS subframes that each include a plurality of symbols, and descrambling CSI-RSs in first and second DRS subframes of the multi-subframe DRS in accordance with a CSI-RS descrambling rule that determines how the second DRS subframe is to be descrambled based on whether the first DRS subframe is included among the first block of subframes or the second block of subframes.

Another embodiment of the disclosure is directed to an access point for configuring channel state information reference signals (CSI-RSs) on a shared communication medium, comprising means for executing a Clear Channel Assessment (CCA) protocol to determine whether to begin transmission within a Discovery Reference Signaling (DRS) Measurement Timing Configuration (DMTC) window of a Radio Frame that includes a first block of subframes and a second block of subframes, means for transmitting, based on the executing, a multi-subframe DRS within the DMTC window, the multi-subframe DRS including a plurality of DRS subframes that each include a plurality of symbols, and means for scrambling CSI-RSs in first and second DRS subframes of the multi-subframe DRS in accordance with a CSI-RS scrambling rule that determines how the second DRS subframe is to be scrambled based on whether the first DRS subframe is included among the first block of subframes or the second block of subframes.

Another embodiment of the disclosure is directed to a user equipment (UE) configured to obtain channel state information reference signals (CSI-RSs) on a shared communication medium, comprising means for monitoring a Discovery Reference Signaling (DRS) Measurement Timing Configuration (DMTC) window of a Radio Frame that includes a first block of subframes and a second block of subframes, means for receiving, based on the monitoring, a multi-subframe DRS within the DMTC window, the multi-subframe DRS including a plurality of DRS subframes that each include a plurality of symbols, and means for descrambling CSI-RSs in first and second DRS subframes of the multi-subframe DRS in accordance with a CSI-RS descrambling rule that determines how the second DRS subframe is to be descrambled based on whether the first DRS subframe is included among the first block of subframes or the second block of subframes.

Another embodiment of the disclosure is directed to an access point for configuring channel state information reference signals (CSI-RSs) on a shared communication medium, comprising a memory, at least one transceiver, and at least one processor coupled to the memory and the at least one transceiver and configured to execute a Clear Channel Assessment (CCA) protocol to determine whether to begin transmission within a Discovery Reference Signaling (DRS) Measurement Timing Configuration (DMTC) window of a Radio Frame that includes a first block of subframes and a second block of subframes, transmit, based on the execution, a multi-subframe DRS within the DMTC window, the multi-subframe DRS including a plurality of DRS subframes that each include a plurality of symbols, and scramble CSI-RSs in first and second DRS subframes of the multi-subframe DRS in accordance with a CSI-RS scrambling rule that determines how the second DRS subframe is to be scrambled based on whether the first DRS subframe is included among the first block of subframes or the second block of subframes.

Another embodiment of the disclosure is directed to a user equipment (UE) configured to obtain channel state information reference signals (CSI-RSs) on a shared communication medium, comprising a memory, at least one transceiver, and at least one processor coupled to the memory and the at least one transceiver and configured to monitor a Discovery Reference Signaling (DRS) Measurement Timing Configuration (DMTC) window of a Radio Frame that includes a first block of subframes and a second block of subframes, receive, based on the monitoring, a multi-subframe DRS within the DMTC window, the multi-subframe DRS including a plurality of DRS subframes that each include a plurality of symbols, and descramble CSI-RSs in first and second DRS subframes of the multi-subframe DRS in accordance with a CSI-RS descrambling rule that determines how the second DRS subframe is to be descrambled based on whether the first DRS subframe is included among the first block of subframes or the second block of subframes.

Another embodiment of the disclosure is directed to a non-transitory computer-readable medium containing instructions stored thereon, which, when executed by an access point for configuring channel state information reference signals (CSI-RSs) on a shared communication medium, cause the access point to perform operations, the instructions comprising at least one instruction to cause the access point to execute a Clear Channel Assessment (CCA) protocol to determine whether to begin transmission within a Discovery Reference Signaling (DRS) Measurement Timing Configuration (DMTC) window of a Radio Frame that includes a first block of subframes and a second block of subframes, at least one instruction to cause the access point to transmit, based on the execution, a multi-subframe DRS within the DMTC window, the multi-subframe DRS including a plurality of DRS subframes that each include a plurality of symbols, and at least one instruction to cause the access point to scramble CSI-RSs in first and second DRS subframes of the multi-subframe DRS in accordance with a CSI-RS scrambling rule that determines how the second DRS subframe is to be scrambled based on whether the first DRS subframe is included among the first block of subframes or the second block of subframes.

Another embodiment of the disclosure is directed to a non-transitory computer-readable medium containing instructions stored thereon, which, when executed by a user equipment (UE) configured to obtain channel state information reference signals (CSI-RSs) on a shared communication medium, cause the access point to perform operations, the instructions comprising at least one instruction to cause the UE to monitor a Discovery Reference Signaling (DRS) Measurement Timing Configuration (DMTC) window of a Radio Frame that includes a first block of subframes and a second block of subframes, at least one instruction to cause the UE to receive, based on the monitoring, a multi-subframe DRS within the DMTC window, the multi-subframe DRS including a plurality of DRS subframes that each include a plurality of symbols, and at least one instruction to cause the UE to descramble CSI-RSs in first and second DRS subframes of the multi-subframe DRS in accordance with a CSI-RS descrambling rule that determines how the second DRS subframe is to be descrambled based on whether the first DRS subframe is included among the first block of subframes or the second block of subframes.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Techniques for transmitting a Discovery Reference Signaling (DRS) on a radio link of a shared communication medium are disclosed. In an aspect, the radio link may be a Long-Term Evolution (LTE) in unlicensed spectrum radio link.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
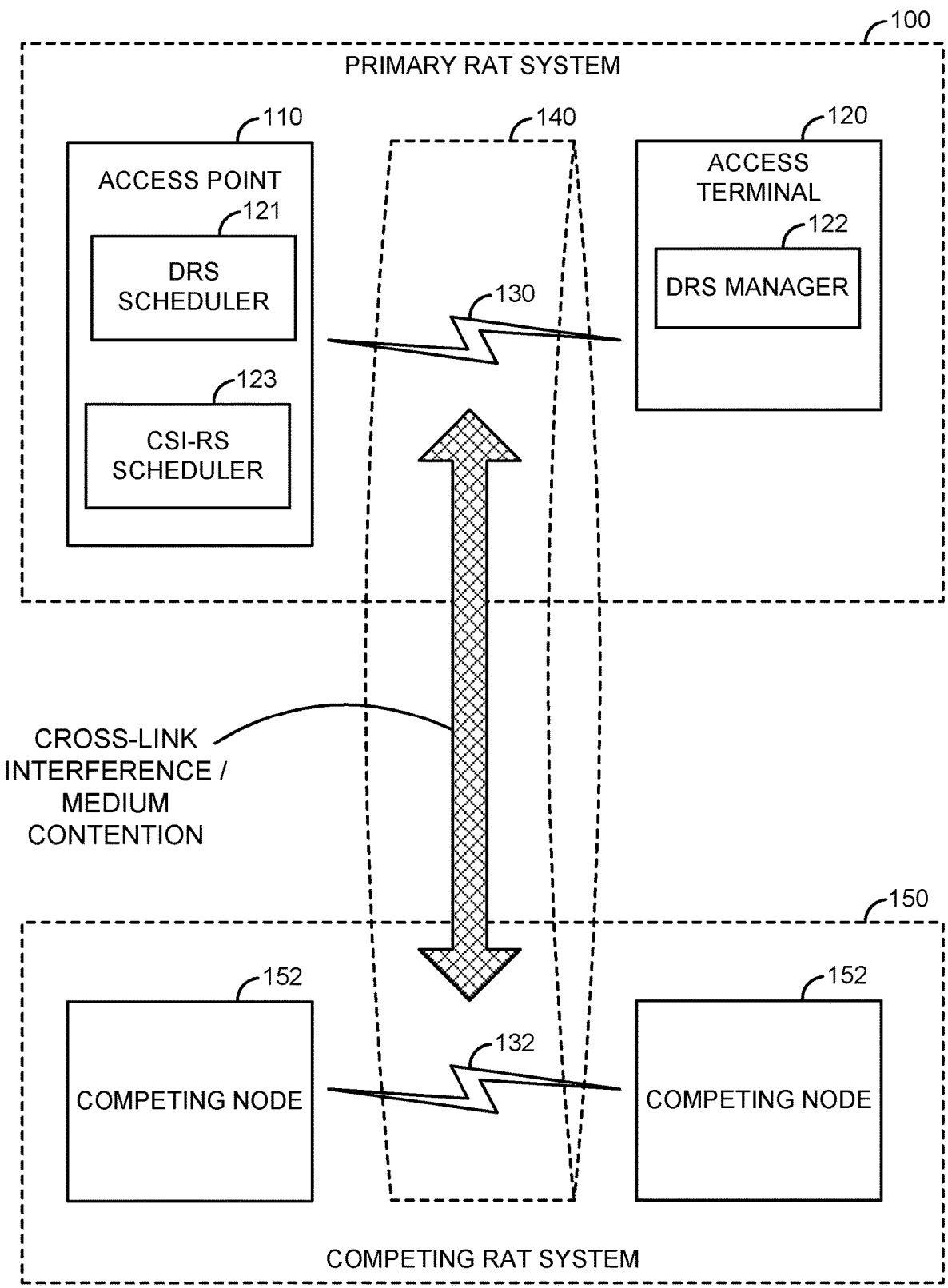
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a radio link, including information related to various types of communication (e.g., voice, data, multimedia services, associated control signaling, etc.). The primary RAT system 100 is shown as including an access point 110 and an access terminal 120 in communication with each other over a radio link 130. The competing RAT system 150 is shown as including two competing nodes 152 in communication with each other over a separate radio link 132, and may similarly include one or more access points, access terminals, or other types of wireless nodes. As an example, the access point 110 and the access terminal 120 of the primary RAT system 100 may communicate via the radio link 130 in accordance with Long Term Evolution (LTE) technology, while the competing nodes 152 of the competing RAT system 150 may communicate via the radio link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the radio link 130 used by the primary RAT system 100 and the radio link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the radio link 130 and the radio link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 may include a DRS scheduler 121 and the access terminal 120 may include a DRS manager 122. The DRS scheduler 121 may be configured to generate and facilitate transmission of the multi-subframe DRS described below with respect to FIGS. 3A-3B, and the DRS manager 122 may be configured to facilitate decoding of the multi-subframe DRS at the access terminal 120.

Moreover, as will be described in more detail below, the access point 110 may include a channel state information reference signal (CSI-RS) scheduler 123. The CSI-RS scheduler 123 may be configured to generate and facilitate transmission of the multi-subframe DRS described below with respect to FIGS. 3A-3B, with CSI-RS(s) being scrambled as described below with respect to FIGS. 6-7.

Figure 2:
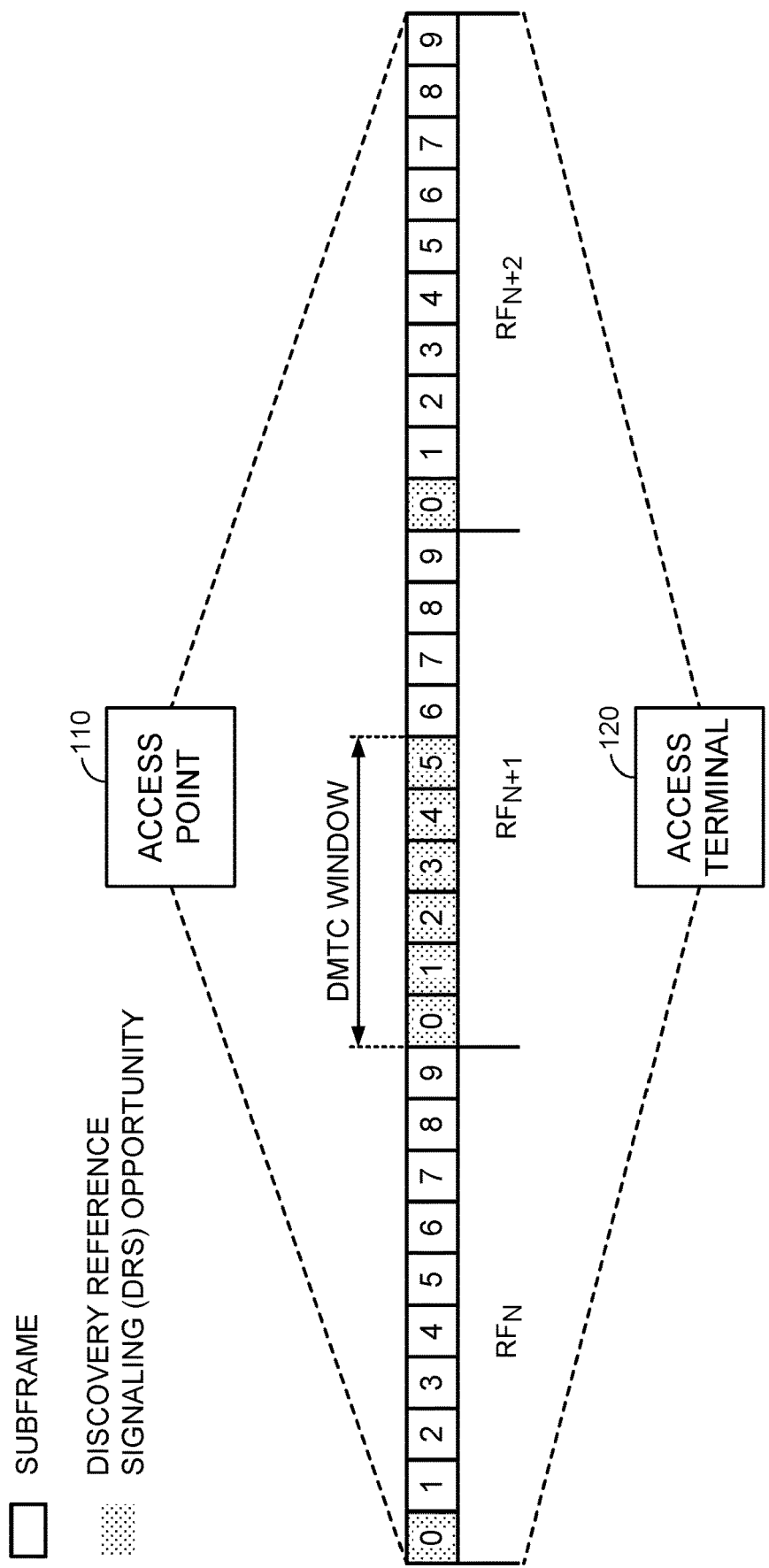
FIG. 2 illustrates an example frame structure according to an aspect of the disclosure.

FIG. 2 illustrates an example frame structure that may be implemented for the primary RAT system 100 on the communication medium 140 to facilitate contention-based access to the communication medium 140.

The illustrated frame structure includes a series of radio frames (RFs) that are numbered in accordance with a system frame number numerology ($RF_N$, $R_{N+1}$, $RF_{N+2}$, etc.) and divided into respective subframes (SFs), which may also be numbered for reference (e.g., SF0, SF1, etc.). Each respective subframe may be further divided into slots (not shown in FIG. 2), and the slots may be further divided into symbol periods. As an example, the LTE frame structure includes system frames that are divided into 1024 numbered radio frames composed of 10 subframes each, which together constitute a system frame cycle (e.g., lasting 10.24 s for 10 ms radio frames having 1 ms subframes). Moreover, each subframe may comprise two slots, and each slot may comprise six or seven symbol periods. The use of a frame structure may provide more natural and efficient coordination among devices than more ad hoc signaling techniques.

In general, the example frame structure of FIG. 2 may be implemented as a Frequency Division Duplex (FDD) frame structure or a Time Division Duplex (TDD) frame structure. In an FDD frame structure, each subframe on a given frequency may be statically configured for uplink (UL) communication for transmitting uplink information from the access terminal 120 to the access point 110 or for downlink (DL) communication for transmitting downlink information from the access point 110 to the access terminal 120. In a TDD frame structure, each subframe may be variously operated at different times as a downlink (D), uplink (U), or special (S) subframe. Different arrangements of downlink, uplink, and special subframes may be referred to as different TDD configurations.

In some designs, the frame structure of FIG. 2 may be "fixed" in that the location of each subframe may be predetermined in relation to an absolute time, but may or may not be occupied by primary RAT signaling in any given instance due to the contention procedure for accessing the communication medium 140. For example, if the access point 110 or the access terminal 120 fail to win contention for a given subframe that subframe may be silenced. In other designs, however, the frame structure of FIG. 2 may be "floating" in that the location of each subframe may be dynamically determined in relation to the point at which access to the communication medium 140 is secured. For example, the start of a given frame (e.g., $RF_{N+1}$) may be delayed in relation to an absolute time until the access point 110 or the access terminal 120 is able to win contention.

As is further illustrated in FIG. 2, one or more subframes may be designated to include what is referred to herein as Discovery Reference Signaling (DRS). The DRS may be configured to convey reference signaling for facilitating system operation. The reference signaling may include information relevant to timing synchronization, system acquisition, interference measurements (e.g., Radio Resource Measurements (RRM)/Radio Link Measurements (RLM)), tracking loops, gain reference (e.g., Automatic Gain Control (AGC)), paging, etc. As an example, the DRS may include a Primary Synchronization Signal (PSS) and a Secondary Synchronization Signal (SSS) for cell searching, a Cell-specific Reference Signal (CRS) for RRM, a Physical Broadcast Channel (PBCH) for conveying various access parameters, and so on. The DRS may be scheduled for transmission periodically (e.g., every 10 ms) in a designated subframe(s) of each radio frame (e.g., subframe SF0) or in a range of such subframes referred to as a DRS Measurement Timing Configuration (DMTC) window defined around a designated subframe (e.g., spanning the first six subframes SF0 to SF5 of the radio frame).

For LTE operating in licensed spectrum, the periodic DRS signals are used to monitor the quality of the radio link (e.g., radio link 130) and to trigger a Radio Link Failure (RLF) when operating conditions on the radio link deteriorate. In this respect, there are certain key differences between LTE in licensed spectrum and LTE in unlicensed spectrum. First, LTE in unlicensed spectrum has fewer CRS instances due to the relatively sparse DRS periodicity. More specifically, for LTE in licensed spectrum, CRS occurs every SF, whereas for LTE in unlicensed spectrum, DRS typically occurs every 40 ms, 80 ms, or 160 ms. Second, LTE in unlicensed spectrum has missed DRS events, which may be due to an LBT failure at the access point 110 or a CRS scrambling mismatch at the access terminal 120.

According to the MulteFire Alliance specification (e.g., MulteFire 1.0), within a DMTC, DRS scrambling is either SF0 or SF5 scrambling, depending on whether DRS is transmitted on SF0 to SF4 or SF5 to SF9, respectively. On subframes within the DMTC, a subframe may have subframe specific scrambling or DRS scrambling. The ability to monitor one or both CRS scrambling possibilities (i.e., one or both of SF0 and SF5) is a capability of the access terminal 120 defined by the value "mf-MonitorTwoCRSScramblings." Referring again to the MulteFire Alliance specification, within the serving cell DMTC, the access terminal 120 prioritizes the monitoring of signals that use subframe specific scrambling.

Figure 3A:
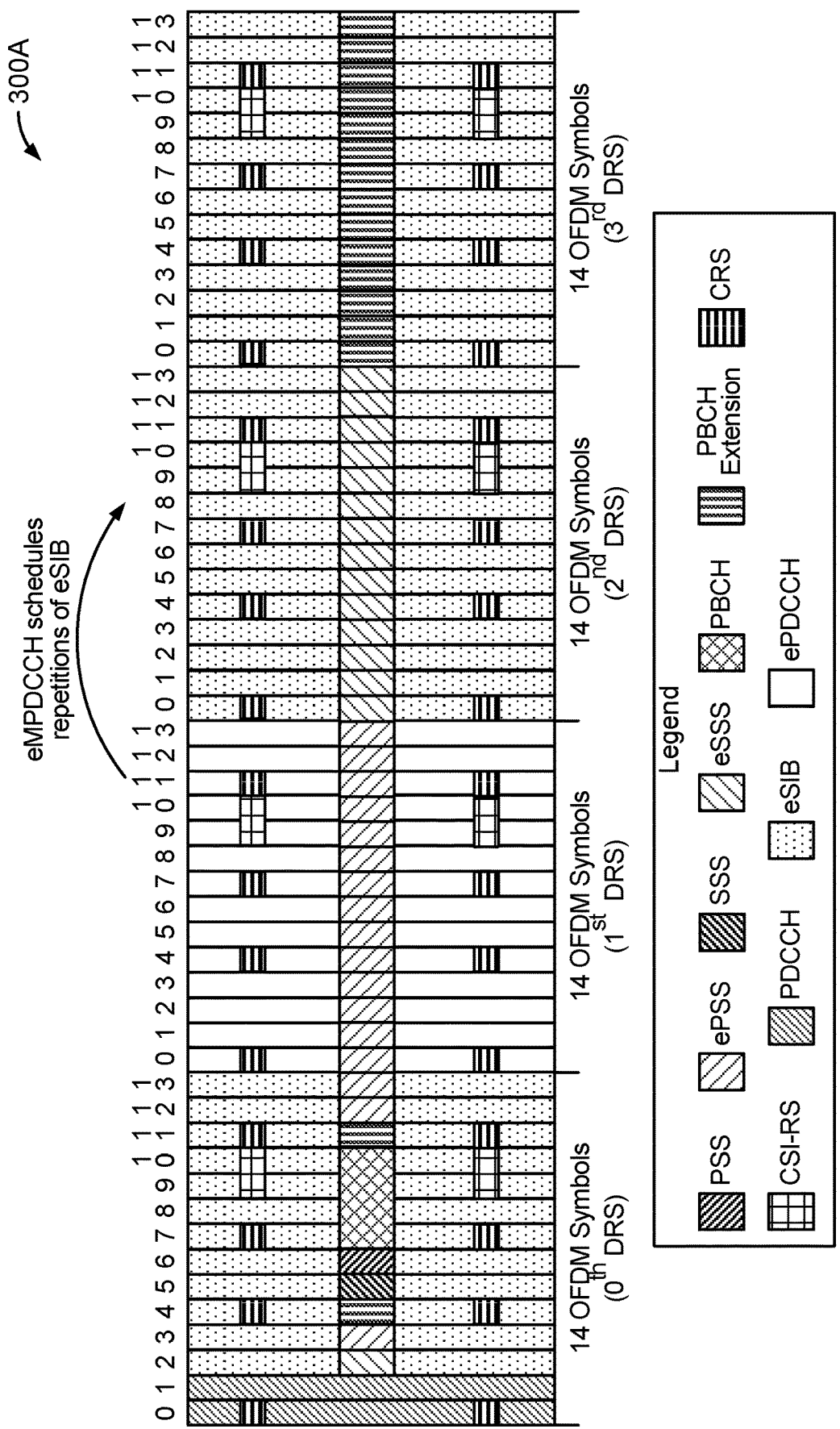
FIG. 3A illustrates multi-subframe Discovery Reference Signaling (DRS) in accordance with an embodiment of the disclosure.

FIG. 3A illustrates a multi-subframe DRS 300A in accordance with an embodiment of the disclosure. In particular, FIG. 3A depicts a resource map of channels to resource blocks within the multi-subframe DRS 300A.

In an example, the multi-subframe DRS 300A may be supported by LBT Category 4 (Cat 4). As shown in FIG. 3A, the multi-subframe DRS 300A includes subframes 0 . . . 3 (referred to below as the $0^{th}$, $1^{st}$, $2^{nd}$ and $3^{rd}$ DRS subframes) that each include 14 symbols denoted as symbols 0 . . . 13. The first subframe (or $0^{th}$ DRS subframe) is a legacy MulteFire DRS subframe that is extended to 14 symbols. In other embodiments, the multi-subframe DRS 300A may be configured with a different number of DRS subframes (e.g., 5, 6, etc.). The later subframes (e.g., the $1^{st}$, $2^{nd}$ and $3^{rd}$ DRS subframes) may be used for coverage enhancement (CE) for extended PSSs (ePSSs), extended SSSs (eSSSs), an extended PBCH (ePBCH) and extended system information block (eSIBs). In particular, the $1^{st}$ DRS subframe may include an ePSS in each of symbols 0 . . . 14 and may be referred to as an ePSS subframe, the $2^{nd}$ DRS subframe may include an eSSS in each of symbols 0 . . . 14 and may be referred to as an eSSS subframe, and the $3^{rd}$ DRS subframe may include an ePBCH in each of symbols 0 . . . 14 and may be referred to as an ePBCH subframe.

Referring to FIG. 3A, two PSSs may be included within the multi-subframe DRS 300A for one shot acquisition at a Signal-to-Noise Ratio (SNR) of −6 dB. At least 12 or 14 ePSSs may be included to support 6 Resource Blocks (RBs) on 62 carriers. A different set of ePSS sequences of length 62 may be used in the $1^{st}$ DRS subframe relative to the $0^{th}$ DRS subframe (e.g., 1/3 hypothesis). Use length −12/14 cover code to generate 12/14 repetitions in 12/14 OFDM symbols (similar to Narrow Band (NB)-PSS).

In an embodiment, the eSSS may be repeated over 12/14 symbols in the $2^{nd}$ DRS subframe following the ePSS subframe (or $1^{st}$ DRS subframe). Each eSSS may be configured to convey 1 out of 168 cell IDs within a cell ID group (e.g., assuming 3 hypotheses in ePSS). In an example, the starting symbol of the $2^{nd}$ DRS subframe may be conveyed via the SSS in the $0^{th}$ DRS subframe using a different short code. The short code depends on whether the $2^{nd}$ DRS subframe is located in SF0-SF4 or SF5-SF9.

In another embodiment, the SSS may be configured similarly to Narrow Band SSS (NSSS) in NB-IoT by extending the number of eSSS repetitions to 12/14 symbols and 6 RBs of bandwidth. Each eSSS conveys 1 out of 504 cell IDs (e.g., assuming 1 hypothesis in ePSS).

Figure 3B:
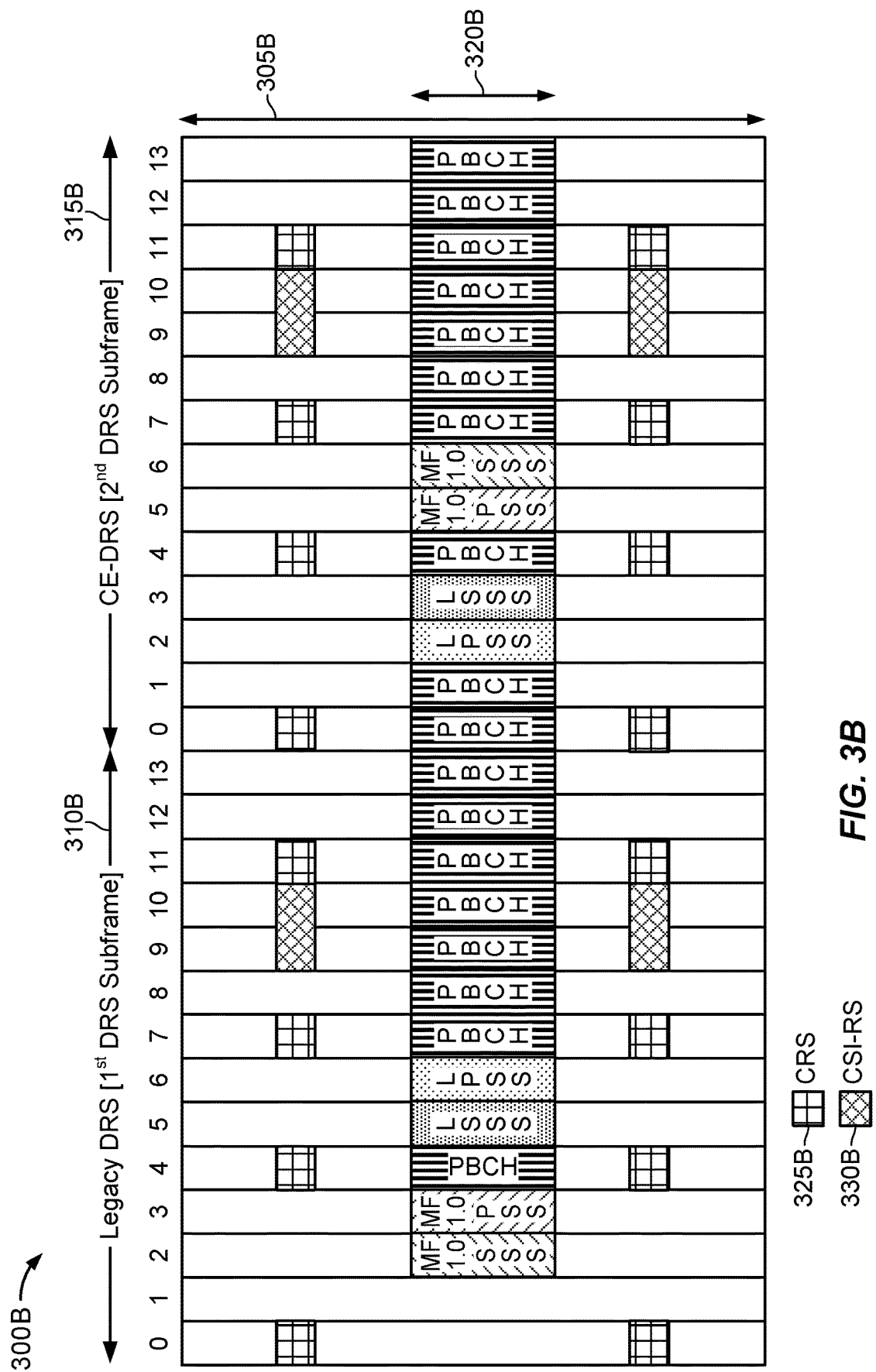
FIG. 3B illustrates a multi-subframe DRS in accordance with another embodiment of the disclosure.

FIG. 3B illustrates a multi-subframe DRS 300B in accordance with another embodiment of the disclosure. In particular, FIG. 3B depicts a resource map of channels to resource blocks within the multi-subframe DRS 300B. In an example, similar to FIG. 3A, the multi-subframe DRS 300B may be supported by LBT Cat 4. Unlike the multi-subframe DRS 300A in FIG. 3A, the multi-subframe DRS 300B in FIG. 3B includes two (2) DRS subframes. Below, FIG. 3B is described at a lower level of detail as compared to FIG. 3A to emphasize particular aspects.

Referring to FIG. 3B, channel bandwidth 305B spans a portion of available frequencies, and OFDM symbols 0 to 13 of each DRS subframe 310B and 315B within the bandwidth 305B are labeled across the top of the allocated resources. The MF 1.0 PSS and the MF 1.0 SSS (which may alternatively be referred to as ePSS and eSSS, respectively) may be transported on R sub-carriers 320B centered within the bandwidth 305B. Each of the R sub-carriers 320B may be offset by one another in frequency (e.g., 15 kHz between each sub-carrier). As shown in example multi-subframe DRS 300B, to aid PSS detection, the access point 110 may transmit the MF 1.0 PSS within a set of consecutive DRS subframes (e.g., within symbol 3 of DRS subframe 310B, within symbol 5 of DRS subframe 315B). The same R sub-carriers 320B may also be used to transport MF 1.0 SSS and PBCH in DRS subframes 310B and 315B. For example, to aid SSS detection, the access point 110 may transmit the MF 1.0 SSS within the set of consecutive DRS subframes (e.g., within symbol 2 of DRS subframe 310B, within symbol 6 of DRS subframes 315B), and the access point 110 may further transmit the PBCH in symbols 4 and 7-13 of DRS subframe 310B as well as symbols 0-1, 4 and 7-13 of DRS subframe 315B.

Referring to FIG. 3B, the legacy PSS is carried in symbol 6 of DRS subframe 310B and in symbol 2 of DRS subframe 315B, and the legacy SSS is carried in symbol 5 of DRS subframe 310B and in symbol 3 of DRS subframe 315B. The unlabeled portions of the time and frequency resources of DRS subframes 310B-315B may be used to transport other information, such as legacy Physical downlink Control Channel (PDCCH), SIB, MF SIB, PDCCH for SIB, and/or the like.

Referring to FIG. 3B, each of the MF 1.0 PSS and the MF 1.0 SSS are transmitted in respective single symbol periods of a given DRS subframe. As shown in DRS subframe 310B, the PSS sequence may be transmitted after the SSS sequence (e.g., the MF 1.0 PSS may be transmitted in symbol 3, while the MF 1.0 SSS may be transmitted in symbol 2) and before a legacy SSS and a legacy PSS (e.g., transmitted in symbol 6 and symbol 5, respectively). As shown in DRS subframe 315B, the PSS sequence may be transmitted before the SSS sequence (e.g., the MF 1.0 PSS may be transmitted in symbol 5, while the MF 1.0 SSS may be transmitted in symbol 6) and after the legacy PSS and the legacy SSS (e.g., transmitted in symbol 2 and symbol 3, respectively).

In this example, in DRS subframe 315B, the MF 1.0 PSS is transmitted before the MF 1.0 SSS (e.g., rather than after the MF 1.0 SSS as in DRS subframe 310B). In some aspects, transmitting the MF 1.0 PSS before the MF 1.0 SSS (e.g., rather than after the MF 1.0 SSS as in DRS subframe 310B) prevents a legacy UE (e.g., a UE that uses the legacy PSS and the legacy SSS alone to perform synchronization) from attempting synchronization based on the MF 1.0 PSS and the MF 1.0 SSS, thereby conserving battery power and/or processor resources of the legacy UE. For example, since no MF 1.0 SSS is present before the MF 1.0 PSS in DRS subframe 315B, the legacy UE will stop a synchronization procedure and/or not attempt to decode a PBCH associated with these subframes, which conserves battery power and/or processor resources of the legacy UE.

Further, in DRS subframe 315B, the location of the MF 1.0 PSS and the MF 1.0 SSS is swapped with the location of the legacy PSS and the legacy SSS (e.g., as compared to DRS subframe 310B). For example, in DRS subframe 310B, the MF 1.0 SSS and the MF 1.0 PSS are transmitted in symbols 2 and 3, respectively, and the legacy SSS and the legacy PSS are transmitted in symbols 5 and 6, respectively. However, in DRS subframe 315B, the MF 1.0 PSS and the MF 1.0 SSS are transmitted in symbols 5 and 6, respectively, and the legacy PSS and the legacy SSS are transmitted in symbols 2 and 3, respectively. In some aspects, swapping the locations of the MF 1.0 PSS/SSS and the legacy PSS/legacy SSS improves the likelihood of a legacy UE being able to identify the start of the subframe (e.g., since the MF 1.0 PSS/SSS are transmitted later in the subframe). Furthermore, in some aspects, the MF 1.0 SSS may be a same sequence as the legacy SSS, which reduces complexity at the access point 110 and UE(s).

Referring to FIG. 3B, in addition to the data sent on the R sub-carriers 320B as noted above, the access point 110 may further transmit a CRS 325B and a channel state information reference signal (CSI-RS) 330B on different sub-carriers of various symbols of the DRS subframes 310B-315B as depicted in FIG. 3B. The CSI-RS 330B is used by UEs to estimate the channel and report channel quality information (CQI) back to the access point 110.

Figure 4:
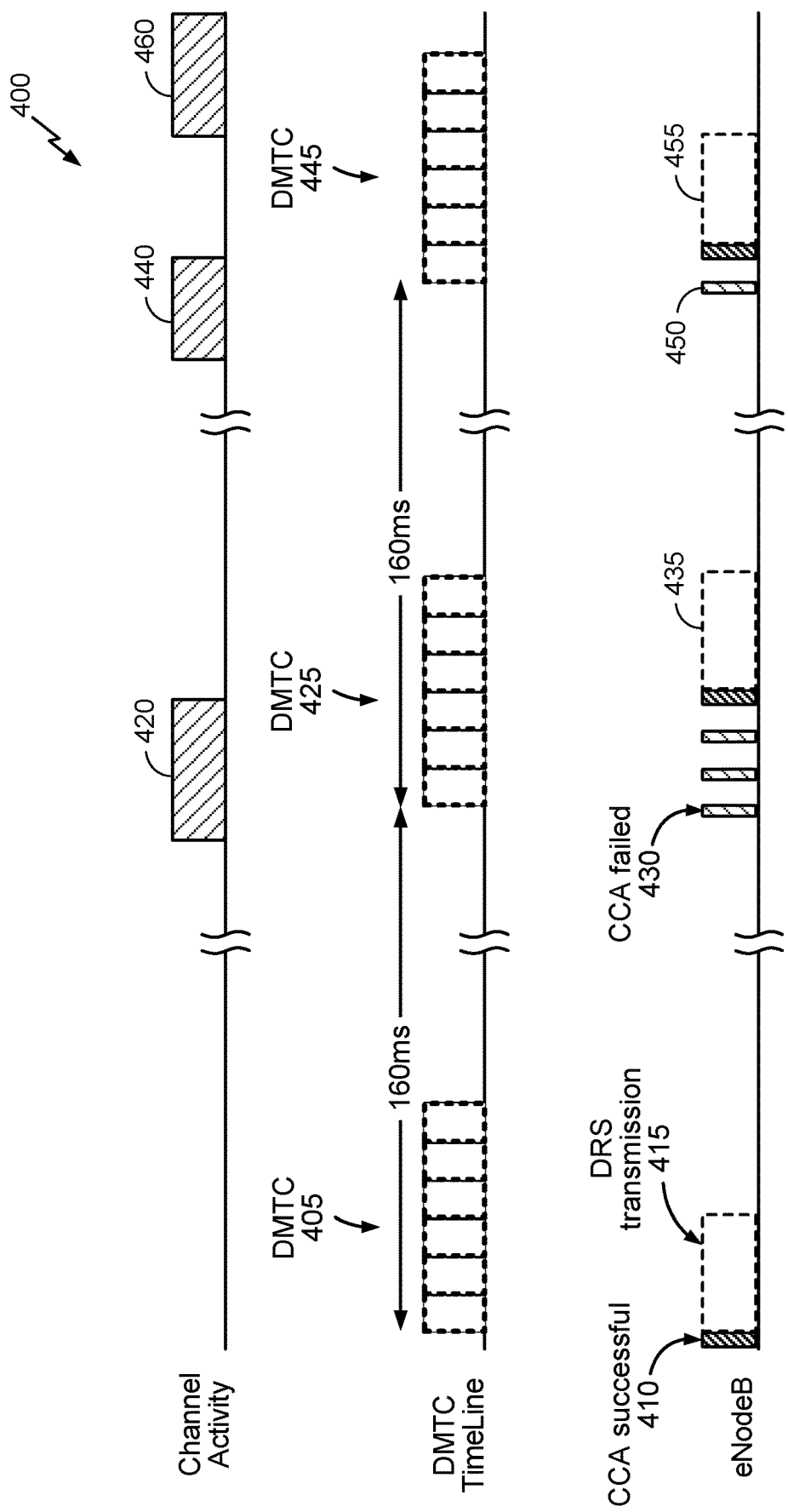
FIG. 4 illustrates a timing diagram depicting an example DRS transmission scheme that may be implemented on a shared communication medium in accordance with another embodiment of the disclosure.

FIG. 4 illustrates a timing diagram 400 depicting an example DRS transmission scheme that may be implemented on the communication medium 140 in accordance with another embodiment of the disclosure. Referring to FIG. 4, it will be appreciated that a DRS may start in any subframe in a DMTC window subject to LBT clearance, and UEs need to descramble CRS (to determine the corresponding cell ID) to decode PBCH after PSS and SSS detection. As shown in FIG. 4, the start of a first DMTC window 405 causes the access point 110 to check whether the channel is clear at 410 (e.g., via LBT Cat 4). The channel is detected as clear at 410, and the access point 110 then transmits the DRS, such as the multi-subframe DRS 300A or the multi-subframe DRS 300B described above with respect to FIGS. 3A-3B. Next, assume that interfering channel activity occurs at 420. At the start of a second DMTC window 425, the access point 110 checks whether channel is clear at 430 (e.g., via LBT Cat 4). The channel is detected as not being clear (or CCA failed) at 430, which delays transmission of the DRS (e.g., the multi-subframe DRS 300A or the multi-subframe DRS 300B described above with respect to FIGS. 3A-3B) until the channel is cleared at 435. Next, assume that interfering channel activity occurs at 440. At the start of a third DMTC window 445, the access point 110 checks whether channel is clear at 450 (e.g., via LBT Cat 4). The channel is detected as not being clear (or CCA failed) at 450, which delays transmission of the DRS (e.g., the multi-subframe DRS 300A or the multi-subframe DRS 300B described above with respect to FIGS. 3A-3B) until the channel is cleared at 455. After the DRS is transmitted at 455, assume that interfering channel activity occurs at 460.

In an embodiment, each eSSS or MF 1.0 SSS may convey the starting position of the DRS subframe carrying the respective eSSS or MF 1.0 SSS (e.g., in FIG. 3A, the $1^{st}$ DRS subframe carrying the ePSS, and in FIG. 3B, the $1^{st}$ DRS subframe carrying the MF 1.0 PSS) as SF0 (e.g., between SF0-SF4) or SF5 (e.g., between SF5-SF9). In an example, if the $1^{st}$ DRS subframe of the multi-subframe DRS 300A or 300B falls within SF0-SF4, then the N+1th DRS subframe may use a scrambling of SF(N) mod 10. Accordingly, if the $1^{st}$ DRS subframe of the multi-subframe DRS 300A or 300B falls within SF0-SF4, then the $1^{st}$ DRS subframe of the multi-subframe DRS 300A or 300B may use a scrambling of SF0 mod 10, the $2^{nd}$ DRS subframe of the multi-subframe DRS 300A or 300B may use a scrambling of SF1 mod 10, and so on. In another example, if the $1^{st}$ DRS subframe of the multi-subframe DRS 300A or 300B falls within SF5-SF9, then the N+1th DRS subframe may use a scrambling of SF(N+5) mod 10. Accordingly, if the $1^{st}$ DRS subframe of the multi-subframe DRS 300A or 300B falls within SF5-SF9, then the $1^{st}$ DRS subframe of the multi-subframe DRS 300A may use a scrambling of SF5 mod 10, the $2^{nd}$ DRS subframe of the multi-subframe DRS 300A or 300B may use a scrambling of SF6 mod 10, and so on.

In another embodiment, each eSSS or MF 1.0 SSS may convey the starting position of the multi-subframe DRS 300A or 300B as SF0 (e.g., between SF0-SF4) or SF5 (e.g., between SF5-SF9). In an example, the N+1th DRS subframe may use a scrambling of SF(N) mod 10. Accordingly, if the $1^{st}$ DRS subframe falls within SF0-SF4, the $1^{st}$ DRS subframe of the multi-subframe DRS 300A or 300B may use a scrambling of SF0 mod 10, the $2^{nd}$ DRS subframe of the multi-subframe DRS 300A or 300B may use a scrambling of SF1 mod 10, and so on.

In a further embodiment, MulteFire Alliance specifications, such as MulteFire 1.0, may specify that each PBCH payload is configured with 23 bits+16 cyclic redundancy check (CRC) bits (49 bits/360 Resource Elements (REs)), code rate 49/720) with an SNR requirement of −1.5 dB. PBCH repetition within a DMTC window and combining across DMTC windows may be implemented to achieve coverage enhancement (CE).

Referring again to FIG. 3A, in each subframe, 11-14 symbols can be considered as available for the new PBCH (or ePBCH). In an example, the ePBCH in one DRS subframe can provide 3 dB coverage over a legacy PBCH as defined in MulteFire 1.0. In a further example, 3-4 DRS subframes either back-to-back or spread between multiple DMTC windows can provide 9 dB-12 dB coverage over legacy PBCH subframe as defined in MulteFire 1.0. As shown in the multi-subframe DRS 300A of FIG. 3A, the ePBCH repetition may begin at the $3^{rd}$ DRS subframe, after the ePSS repetition in the $1^{st}$ DRS subframe and the eSSS repetition in the $2^{nd}$ DRS subframe. In an example, the ePBCH (or coverage enhancement (CE)-PBCH) may be punctured by regular CRS, CSI-RS, and MF 1.0 (or legacy) PSS/SSS/PBCH.

Figure 5:
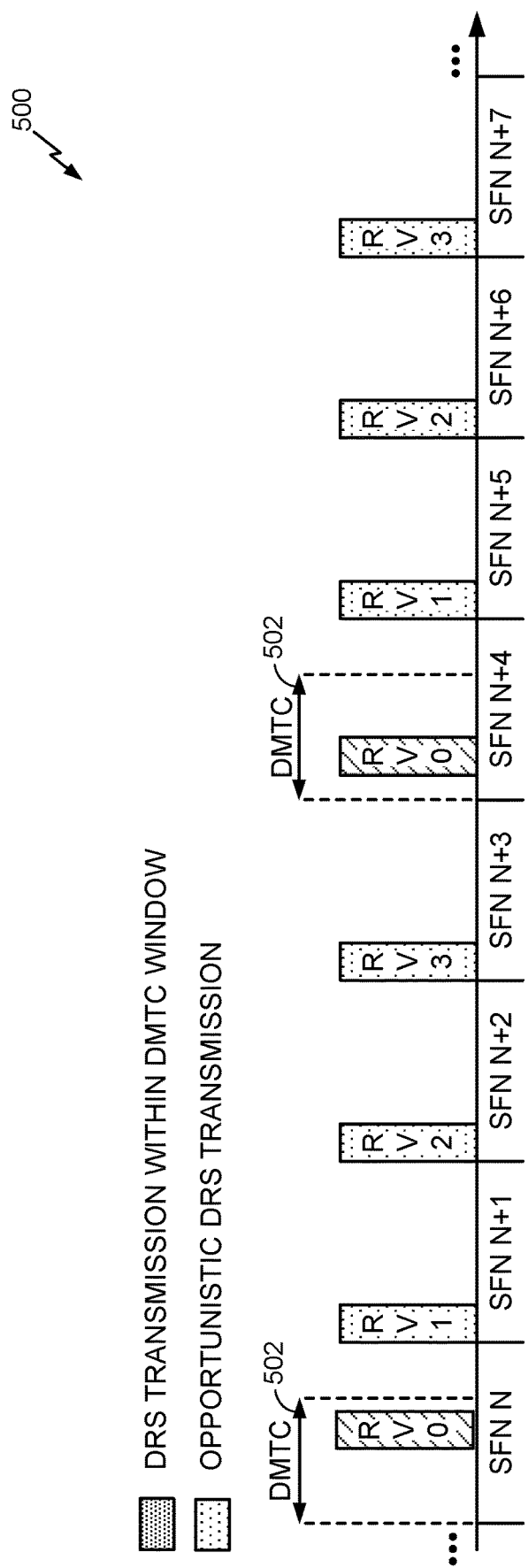
FIG. 5 illustrates a timing diagram depicting an example DRS transmission scheme that may be implemented on a shared communication medium in accordance with another embodiment of the disclosure.

FIG. 5 illustrates a timing diagram 500 depicting an example DRS transmission scheme that may be implemented on the communication medium 140 in accordance with another embodiment of the disclosure. As shown, in some instances, the access point 110 may transmit the DRS opportunistically in a designated subframe when access to the communication medium 140 is available for that designated subframe. Otherwise, when access to the communication medium 140 is not available for the designated subframe, the access point 110 may refrain from transmitting the DRS until the next designated subframe. Opportunistic DRS transmission (e.g., which may be used for legacy MulteFire 1.0 but not necessarily in later versions, such as MulteFire 1.1+) at a designated subframe is shown by way of example in FIG. 5 at radio frames System Frame Number (SFN) N+1, SFN N+2, SFN N+3, SFN N+5, SFN N+6, and SFN N+7.

In other instances, however, the access point 110 may transmit the DRS more flexibly, at any time access to the communication medium 140 is available within a larger DMTC window 502 defined around a designated subframe (e.g., spanning the first 6+ subframes SF0 to SF5 of the radio frame). DRS transmission within the DMTC window 502 is shown by way of example in FIG. 5 at radio frames SFN N and SFN N+4 (e.g., the period of DMTC may be 40 ms, 80 ms or 160 ms). The access terminal 120 may be configured to monitor the communication medium 140 for DRS within each defined DMTC window 502.

The corresponding DMTC window 502 may be scheduled periodically (e.g., every 40 ms, 80 ms or 160 ms) in designated radio frames, which can be coordinated with the access terminal 120. In the illustrated example, the DMTC window 502 is scheduled every fourth radio frame at SFN N, SFN N+4, and so on. It will be appreciated, however, that other configurations may be employed as desired to balance the different DRS transmission schemes.

In either case, certain signaling included in the DRS may be transmitted with a corresponding redundancy version (RV), as appropriate, at least for an otherwise common payload. In the illustrated example, such signaling may be transmitted with a first redundancy version (RV0) in a first instance (SFN N within the DTxW 502), a second redundancy version (RV1) in the next instance (SFN N+1), a third redundancy version (RV2) in the next instance (SFN N+2), a fourth redundancy version (RV3) in the next instance (SFN N+3), and repeat from there as shown when the payload changes (e.g., every fourth radio frame). Use of different redundancy versions may allow for combining gains across time as well as other informational uses.

While illustrated in FIG. 5, the opportunistic DRS transmissions shown in FIG. 5 as RV1~RV3 may be omitted for ePBCH or PBCH repetition for CE mode (e.g., whereby CE mode corresponds to use of a multi-subframe DRS, such as the multi-subframe DRS 300A depicted in FIG. 3A or the multi-subframe DRS 300B depicted in FIG. 3B). So, if RV1-RV3 are transmitted, the RV1-RV3 transmissions may be implemented via the legacy MulteFire 1.0 format in contrast to the multi-subframe DRS format depicted in FIGS. 3A-3B (e.g., because a coverage-enhanced UE may not decode RV1-RV3). In an example, the reason for not transmitting ePBCH with CE with RV1-RV3 in opportunistic DRS is that the DMTC window may be 20 ms, 30 ms, etc. The ePBCH in DRS could move around 3 frames but always transmit with RV0. Also, the repetition in multi-subframe DRS already take up a high number of subframes. For these reasons, in at least one embodiment, the coverage enhanced ePBCH RV1-RV4 need not be implemented.

As will be described in more detail below, the PBCH that may be included in the DRS may be used to convey certain parameters related to accessing the access point 110, such as the downlink system bandwidth, the most significant bits of the system frame number, and so on. The PBCH may also carry information on a technology identifier as well. Some of the reserved bits in the PBCH may be used to convey this information. For instance, some of the reserved bits may be used to indicate that the PBCH transmission corresponds to access point transmission based on a certain version of MulteFire technology as opposed to another technology operating in the same bandwidth.

While PSS/SSS detection may allow the access terminal to synchronize its clock timing, the ePBCH that may be included in the DRS (e.g., configured as shown above in the multi-subframe DRS 300A) may further be used to convey the SFN timing (e.g., in 10 ms increments due to long repetition), as will now be explained in detail.

Referring to FIGS. 3A and 5, in an example, to derive the SFN timing (i.e., identification of the SFN), the SFN of the $3^{rd}$ DRS subframe or the SF in which ePBCH repetition is started is considered as the baseline and is encoded in the PBCH payload. Only ePBCH RV0 is transmitted in the DMTC window 502 starting at the SFN, 10·SFN mod $T_{DMTC}=0$, whereby $T_{DMTC}$ is the period of DMTC window, $T_{DMTC} \in \{\ldots, 160, 320\}$. The opportunistic DRS transmissions at RV1, RV2 and RV3 may be removed. In an example, each SFN may include 10 bits, and each ePBCH payload may include $$\left(10 - \log_2 \frac{\min(T_{DMTC})}{10}\right)$$

MSB bits out of the 10 available SFN bits to provide the SFN indication. If $\min(T_{DMTC})=160$ ms, only 6 bits is carried for SFN indication Referring to FIGS. 3A and 4, the floating nature of ePSS/eSSS may make indicating subframe timing difficult. For example, as noted above, the eSSS may or may not provide side information that indicates whether the $2^{nd}$ DRS subframe is within SF0-SF4 or SF5-SF9 depending on the eSSS design configuration. It may thereby be difficult to accommodate a DMCW window greater than 10 ms due to long repetitions of ePSSs and eSSSs.

In an embodiment, to derive the subframe timing, the ePBCH may include a subframe offset index (e.g., 3 or 4 bits). The subframe offset index defines an offset of $1^{st}$ DRS subframe or $3^{rd}$ DRS subframe with respect to the actual subframe 0 or subframe 5. In an example, the subframe offset index of the $3^{rd}$ DRS subframe or the first signaling of ePBCH with respect to SF0 or SF5. In an example, to accommodate a large DMTC window that $2^{nd}$ DRS subframe or first signaling of ePBCH may start at next frame, the PBCH may include a frame offset index (e.g., 1 or 2 bits, which specify the offset with respect to the first frame of the DMTC window). In an example, the frame offset of the starting position may be indicated with respect to 10·SFN mod $T_{DMTC}=0$. In an example, the subframe offset index and frame offset index may constitute two separate indices that may be included in the PBCH or ePBCH.

In an embodiment, the multi-subframe DRS configuration described above may be configured to extend MulteFire coverage for deployment within industrial IoT networks and/or automated guided vehicles (AGV) networks. For example, certain AGVs specify a minimum operating bandwidth of 150 kbps with 3× the amount of coverage relative to Wi-Fi or IEEE 802.11 (e.g., 16 dB gain needed over Wi-Fi, SNR requirement of −14 dB), and the above-noted multi-subframe DRS configuration can satisfy these requirements.

As described above, a DRS may start in any subframe in a DMTC window subject to LBT clearance. In additional to descrambling the CRS (e.g., CRS 325B of FIG. 3B) as described above, the access terminal 120 also descrambles the CSI-RS (e.g., e.g., CSI-RS 330B of FIG. 3B) to provide channel quality feedback for rate adaptation by the access point 110. Changing subframe scrambling for the CSI-RS 330B from subframe to subframe due to LBT failure is not implementation friendly for the access point 110.

Figure 6:
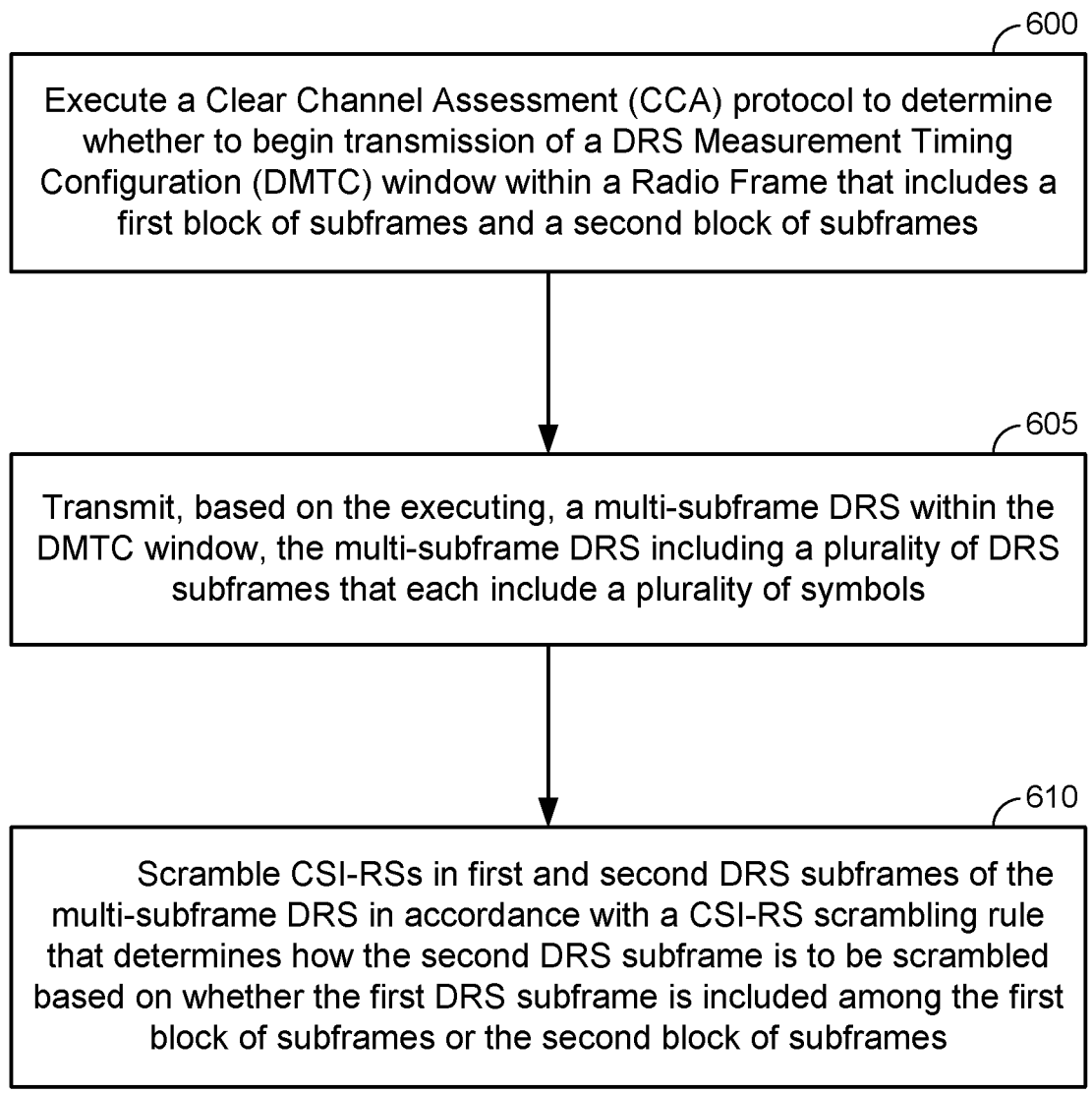
FIG. 6 illustrates a process of configuring CSI-RSs in accordance with an embodiment of the disclosure.

FIG. 6 illustrates a process of configuring CSI-RSs in accordance with an embodiment of the disclosure. The process of FIG. 6 may be implemented at an access point, such as the access point 110 in an example.

Referring to FIG. 6, at block 600, the access point executes a CCA protocol (e.g., LBT Cat 4) to determine whether to begin transmission within a DMTC window of a Radio Frame that includes a first block of subframes (e.g., SF0-SF4) and a second block of subframes (e.g., SF5-SF9). At block 605, the access point transmits, based on block 600, a multi-subframe DRS (e.g., multi-subframe DRS 300A of FIG. 3A or multi-subframe DRS 300B of FIG. 3B) within the DMTC window, the multi-subframe DRS including a plurality of DRS subframes that each include a plurality of symbols. At block 610, the access point scrambles CSI-RSs in first and second DRS subframes of the multi-subframe DRS in accordance with a CSI-RS scrambling rule. More specifically, referring to block 610 of FIG. 6, the CSI-RS scrambling rule determines how the second DRS subframe is to be scrambled based on whether the first DRS subframe is included among the first block or subframes or the second block of subframes.

In one example, the CSI-RS scrambling rule of block 610 corresponds to a fixed subframe rule may be used by the access point 110 and the access terminal 120 for scrambling and descrambling CSI-RSs in DRS subframes, as follows:

Use the scrambling/descrambling rule of SF0 (for each DRS subframe in the multi-subframe DRS) if $1^{st}$ DRS subframe falls in SF0-SF4, and Use the scrambling/descrambling rule (for each DRS subframe in the multi-subframe DRS) of SF5 if $1^{st}$ DRS subframe falls in SF5-SF9.

In an example, the above-noted fixed subframe rule may cause a CSI-RS scrambling mismatch in the $2^{nd}$ DRS subframe for a multi-subframe DRS, such as the multi-subframe DRS 300A of FIG. 3A or the multi-subframe DRS 300B of FIG. 3B. For example, if the multi-subframe DRS falls within SF0-SF4 with the $1^{st}$ DRS subframe being cleared by the access point 110 for transmission at SF0, the access point 110 may use SF0-based scrambling (e.g., SF0, SF0 mod 10, etc.) for the CSI-RS in the $1^{st}$ DRS subframe, and may then continue to use SF0-based scrambling for the CSI-RS in the $2^{nd}$ DRS subframe. At this point, the access terminal 120 needs to switch to SF1 to descramble the $2^{nd}$ DRS subframe in SF1, which would otherwise be misaligned with the SF0-based scrambling of the CSI-RS in the $2^{nd}$ DRS subframe. Likewise, if the multi-subframe DRS falls within SF5-SF9 with the $1^{st}$ DRS subframe being cleared by the access point 110 for transmission at SF5, the access point 110 may use SF5-based scrambling (e.g., SF5, SF5 mod 10, etc.) for the CSI-RS in the $1^{st}$ DRS subframe, and may then continue to use the SF5-based scrambling for the CSI-RS in the $2^{nd}$ DRS subframe. At this point, the access terminal 120 needs to switch to SF6 to descramble the $2^{nd}$ DRS subframe, which would otherwise be misaligned with SF5-based scrambling for the CSI-RS in the $2^{nd}$ DRS subframe.

Figure 7:
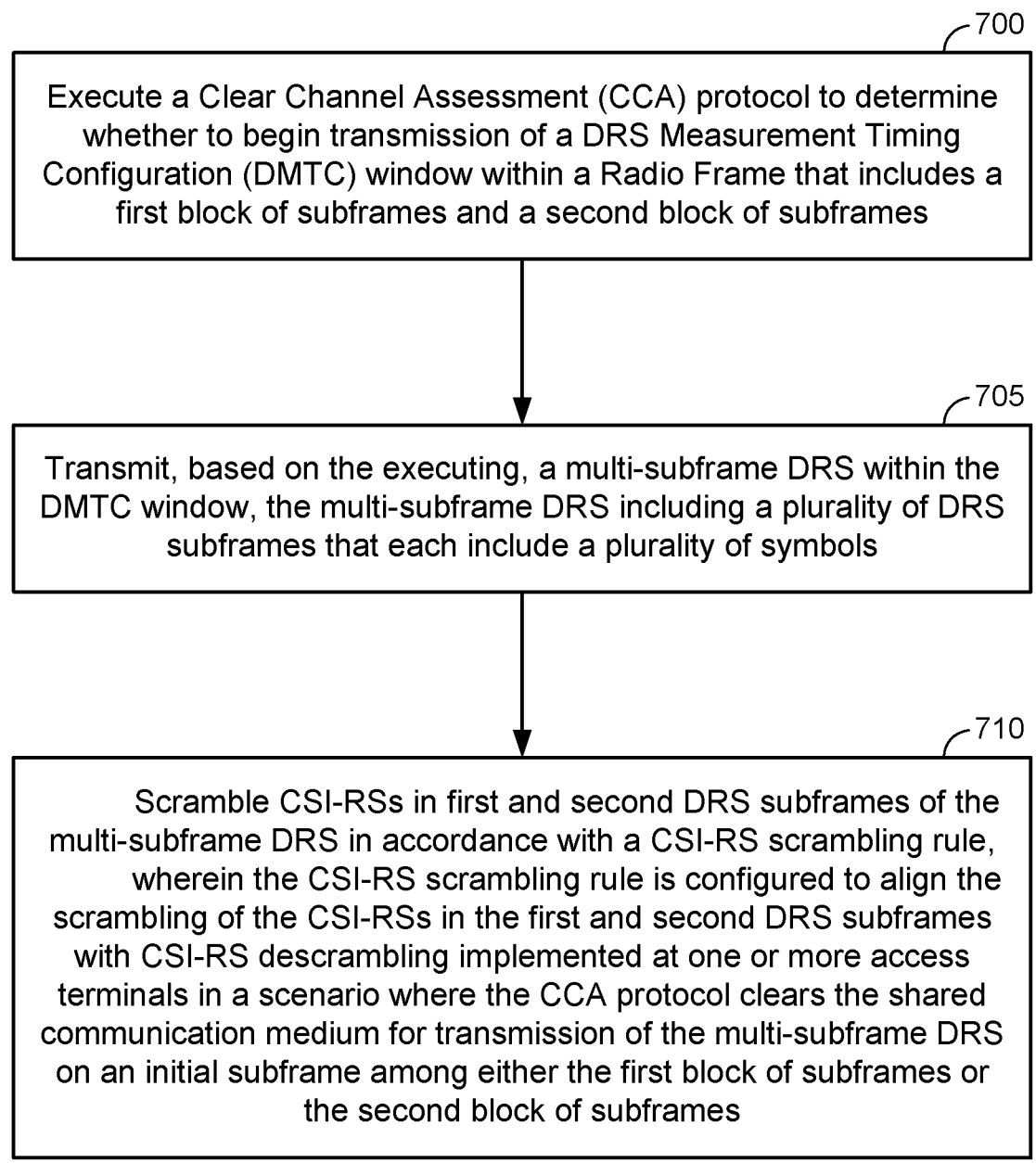
FIG. 7 illustrates a process of configuring CSI-RSs in accordance with another embodiment of the disclosure.

FIG. 7 illustrates a process of configuring CSI-RSs in accordance with another embodiment of the disclosure. The process of FIG. 7 may be implemented at an access point, such as the access point 110 in an example. The process of FIG. 7 corresponds to an example implementation of the process of FIG. 6.

Referring to FIG. 7, at block 700 (e.g., as in block 600 of FIG. 6), the access point executes a CCA protocol (e.g., LBT Cat 4) to determine whether to begin transmission within a DMTC window of a Radio Frame that includes a first block of subframes (e.g., SF0-SF4) and a second block of subframes (e.g., SF5-SF9). At block 705 (e.g., as in block 605 of FIG. 6), the access point transmits, based on block 700, a multi-subframe DRS (e.g., multi-subframe DRS 300A of FIG. 3A or multi-subframe DRS 300B of FIG. 3B) within the DMTC window, the multi-subframe DRS including a plurality of DRS subframes that each include a plurality of symbols. At block 710 (e.g., as in block 610 of FIG. 6), the access point scrambles CSI-RSs in first and second DRS subframes of the multi-subframe DRS in accordance with a CSI-RS scrambling rule.

More specifically, referring to block 710 of FIG. 7, the CSI-RS scrambling rule is configured to align the scrambling of CSI-RSs in the first and second DRS subframes with CSI-RS descrambling (e.g., descrambling in accordance with the fixed subframe rule noted above, whereby SF0-based descrambling is used for descrambling CSI-RSs in DRS subframes falling within SF0-SF4, and SF5-based descrambling is used for descrambling CSI-RSs in DRS subframes falling within SF5-SF9) implemented at one or more access terminals in a scenario where the CCA protocol clears the shared communication medium for transmission of the multi-subframe DRS on an initial subframe (e.g., SF0 or SF5) among either the first block of subframes (e.g., SF0-SF4) or the second block of subframes (e.g., SF5-SF9).

In a first example implementation of block 710 of FIG. 7, if the $1^{st}$ DRS subframe of the multi-subframe falls within SF0-SF4, the access point 110 may use SF0-based scrambling for the CSI-RS(s) in the $1^{st}$ DRS subframe. The access point 110 may then continue to use SF0-based scrambling for the CSI-RS(s) in each subsequent DRS subframe (e.g., $2^{nd}$ DRS subframe, etc.) in accordance with the fixed CRS-RS scrambling rule noted above.

In a second example implementation of block 710 of FIG. 7, if the $1^{st}$ DRS subframe of the multi-subframe falls within SF0-SF4, the access point 110 may use SF0-based scrambling for the CSI-RS(s) in the $1^{st}$ DRS subframe. However, instead of automatically using SF0-based scrambling for the CSI-RS(s) in each DRS subframe as in the fixed CRS-RS scrambling rule noted above, the access point 110 may instead use SF1-based scrambling for the CSI-RS(s) in the $2^{nd}$ DRS subframe. Assuming that the access point 110 clears the LBT channel in SF0, the SF1-based scrambling for the CSI-RS in the $2^{nd}$ DRS subframe is in alignment with the rest of the descrambling being performed by the access terminal 120 in the $2^{nd}$ DRS subframe, such that the potential CSI-RS scrambling mismatch for multi-subframe DRSs noted above is eliminated.

In a third example implementation of block 710 of FIG. 7, if the $1^{st}$ DRS subframe of the multi-subframe falls within SF5-SF9, the access point 110 may use SF5-based scrambling for the CSI-RS(s) in the $1^{st}$ DRS subframe. The access point 110 may then continue to use SF5-based scrambling for the CSI-RS(s) in each subsequent DRS subframe (e.g., $2^{nd}$ DRS subframe, etc.) in accordance with the fixed CRS-RS scrambling rule noted above.

In a fourth example implementation of block 710 of FIG. 7, if the $1^{st}$ DRS subframe of the multi-subframe DRS falls within SF5-SF9, the access point 110 may use SF5-based scrambling for the CSI-RS in the $1^{st}$ DRS subframe. However, instead of automatically using SF5 for the CSI-RS(s) in each DRS subframe as in the fixed CRS-RS scrambling rule noted above, the access point 110 instead uses SF6-based scrambling for the CSI-RS in the $2^{nd}$ DRS subframe. Assuming that the access point 110 clears the LBT channel in SF5, the scrambling of SF6 for the CSI-RS in the $2^{nd}$ DRS subframe is in alignment with the rest of the descrambling being performed by the access terminal 120 in the $2^{nd}$ DRS subframe, such that the potential CSI-RS scrambling mismatch for multi-subframe DRSs noted above is eliminated.

In the second and fourth example implementations of block 710 of FIG. 7 described above, it will be appreciated that the potential CSI-RS scrambling mismatch for multi-subframe DRSs noted above is eliminated specifically under the assumption that the access point 110 is able to clear the channel via LBT at either SF0 or SF5 (i.e., the initial subframes in the respective subframe blocks of SF0-SF4 and SF5-SF9). If the access point 110 is unable to clear the channel via LBT at either SF0 or SF5, the access point 110 may clear the channel via LBT at SF4 or SF9 instead. In this case, the first embodiment may result in CSI-RS scrambling mismatches for both the $1^{st}$ and $2^{nd}$ DRS subframes of the multi-subframe DRS. However, if a fixed CRS-RS scrambling rule is used, a CSI-RS scrambling mismatch can be avoided assuming that the access terminal knows that a particular scrambling type (e.g., SF0 or SF5) is to be used based on whether the $1^{st}$ DRS subframe falls within a first block of subframes (e.g., SF0-SF4) or a second block of subframes (e.g., SF5-SF9).

Figure 8:
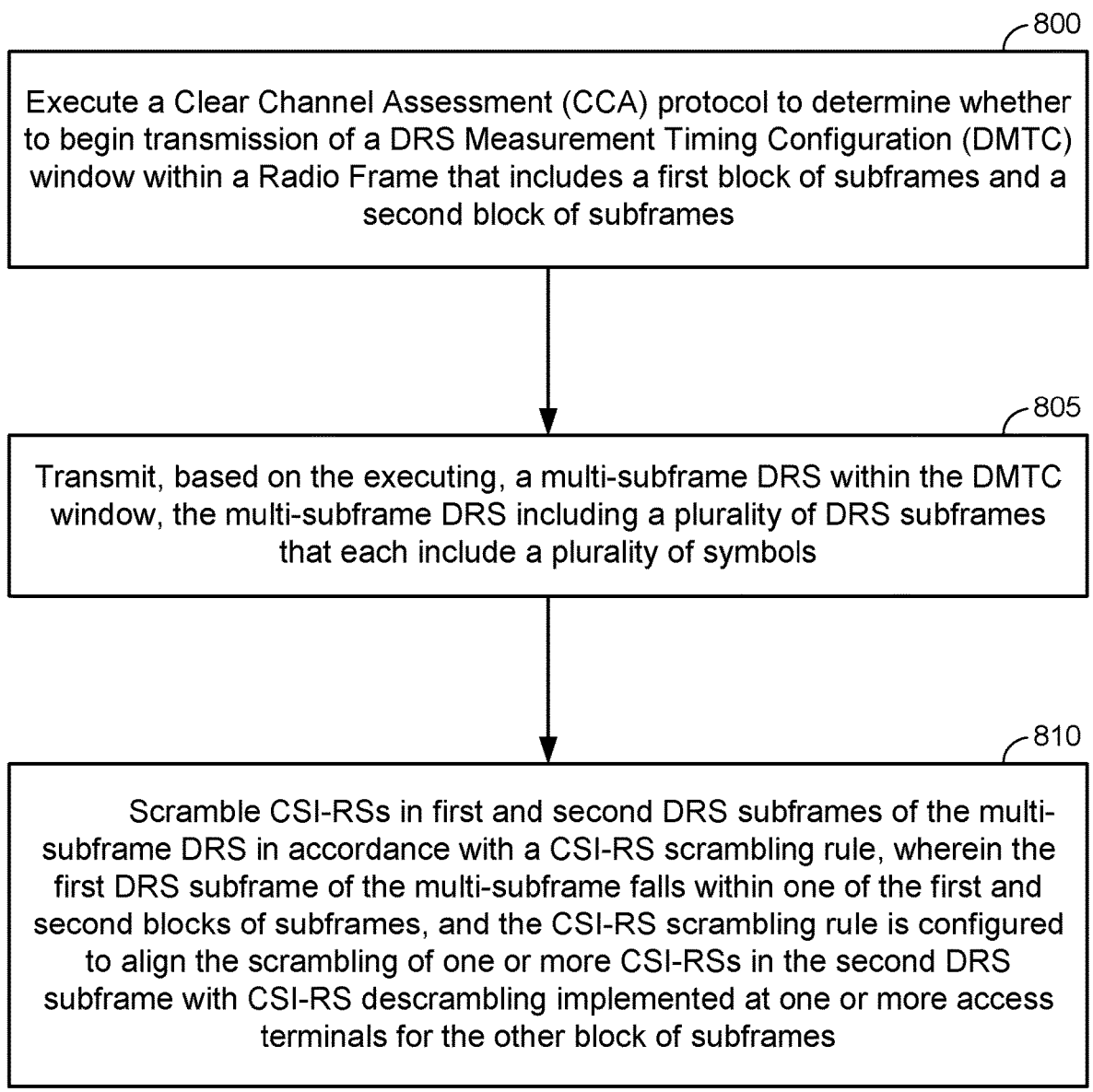
FIG. 8 illustrates a process of configuring CSI-RSs in accordance with another embodiment of the disclosure.

FIG. 8 illustrates a process of configuring CSI-RSs in accordance with another embodiment of the disclosure. The process of FIG. 8 may be implemented at an access point, such as the access point 110 in an example. The process of FIG. 8 corresponds to another example implementation of the process of FIG. 6.

Referring to FIG. 8, at block 800 (e.g., as in block 600 of FIG. 6), the access point executes a CCA protocol (e.g., LBT Cat 4) to determine whether to begin transmission within a DMTC window within a Radio Frame that includes a first block of subframes (e.g., SF0-SF4) and a second block of subframes (e.g., SF5-SF9). At block 805 (e.g., as in block 605 of FIG. 6), the access point transmits, based on block 800, a multi-subframe DRS (e.g., multi-subframe DRS 300A of FIG. 3A or multi-subframe DRS 300B of FIG. 3B) within the DMTC window, the multi-subframe DRS including a plurality of DRS subframes that each include a plurality of symbols. At block 810 (e.g., as in block 610), the access point scrambles CSI-RSs in $1^{st}$ and $2^{nd}$ DRS subframes of the multi-subframe DRS in accordance with a CSI-RS scrambling rule.

More specifically, referring to block 810 of FIG. 8, the $1^{st}$ DRS subframe of the multi-subframe falls within one of the first and second blocks of subframes (e.g., SF0-SF4 or SF5-SF9), and the CSI-RS scrambling rule is configured to align the scrambling of one or more CSI-RSs in the $2^{nd}$ DRS subframe with CSI-RS descrambling (e.g., descrambling in accordance with the fixed subframe rule noted above, whereby SF0-based descrambling is used for descrambling CSI-RSs in DRS subframes falling within SF0-SF4, and SF5-based descrambling is used for descrambling CSI-RSs in DRS subframes falling within SF5-SF9) implemented at one or more access terminals for the other block of subframes.

In a first example implementation of block 810 of FIG. 8, if the $1^{st}$ DRS subframe of the multi-subframe falls within SF0-SF4, the access point 110 may use SF0-based scrambling (e.g., SF0, SF0 mod 10, etc.) for the CSI-RS(s) in the $1^{st}$ DRS subframe, and may then use SF5-based scrambling (e.g., SF5, SF5 mod 10, etc.) for the CSI-RS(s) in the $2^{nd}$ DRS subframe. As will be appreciated, SF5-based descrambling is normally used for CSI-RSs for DRS subframes falling within SF5-SF9. Irrespective of whether the access point 110 clears the LBT channel in SF0, the scrambling of the CSI-RS(s) in one of the $1^{st}$ and $2^{nd}$ DRS subframes will be in alignment with the descrambling being implemented at the access terminal 120 under this scheme, as will be now be explained.

For example, assume that the CCA protocol clears the shared communication medium for transmission of the multi-subframe DRS at SF0, such that the $1^{st}$ DRS subframe transmits at SF0 and the $2^{nd}$ DRS subframe transmits at SF1. The CSI-RS(s) in the $1^{st}$ DRS subframe use SF0-based scrambling in alignment with the SF0-based descrambling used for the $1^{st}$ DRS subframe in SF0, whereas the CSI-RS(s) in the $2^{nd}$ DRS subframe use SF5-based scrambling in misalignment with the SF1-based descrambling used for the $2^{nd}$ DRS subframe in SF1. In an alternative example, assume that the CCA protocol suffers LBT failure at SF0 and is only able to clear the shared communication medium for transmission of the multi-subframe DRS at SF4, such that the $1^{st}$ DRS subframe transmits at SF4 and the $2^{nd}$ DRS subframe transmits at SF5. The CSI-RS(s) in the $1^{st}$ DRS subframe uses SF0-based scrambling in misalignment with the SF4-based descrambling used for the $1^{st}$ DRS subframe in SF4, whereas the CSI-RS(s) in the $2^{nd}$ DRS subframe use SF5-based scrambling in alignment with the SF5-based descrambling used for the $2^{nd}$ DRS subframe in SF5. So, in either case, the scrambling/descrambling of the CSI-RS(s) in one of the two DRS subframes will be aligned.

In a second example implementation of block 810 of FIG. 8, if the $1^{st}$ DRS subframe of the multi-subframe falls within SF5-SF9, the access point 110 may use SF5-based scrambling for the CSI-RS(s) in the $1^{st}$ DRS subframe, and may then use SF0-based scrambling for the CSI-RS(s) in the $2^{nd}$ DRS subframe. As will be appreciated, SF0-based descrambling is normally used for CSI-RSs for DRS subframes falling within SF0-SF4. Irrespective of whether the access point 110 clears the LBT channel in SF0, the scrambling of the CSI-RS(s) in one of the $1^{st}$ and $2^{nd}$ DRS subframes will be in alignment with the descrambling being implemented at the access terminal 120 under this scheme, as will be now be explained.

For example, assume that the CCA protocol clears the shared communication medium for transmission of the multi-subframe DRS at SF5, such that the $1^{st}$ DRS subframe transmits at SF5 and the $2^{nd}$ DRS subframe transmits at SF6. The CSI-RS(s) in the $1^{st}$ DRS subframe use SS-based scrambling in alignment with the SF5-based descrambling used for the $1^{st}$ DRS subframe in SF5, whereas the CSI-RS(s) in the $2^{nd}$ DRS subframe use S0-based scrambling in misalignment with the SF6-based descrambling used for the $2^{nd}$ DRS subframe in SF6. In an alternative example, assume that the CCA protocol suffers LBT failure at SF5 and is only able to clear the shared communication medium for transmission of the multi-subframe DRS at SF9, such that the $1^{st}$ DRS subframe transmits at SF9 and the $2^{nd}$ DRS subframe transmits at SF0 of the next Radio Frame. The CSI-RS(s) in the $1^{st}$ DRS subframe use SS-based scrambling in misalignment with the SF9-based descrambling used for the $1^{st}$ DRS subframe in SF9, whereas the CSI-RS(s) in the $2^{nd}$ DRS subframe use S0-based scrambling in alignment with the SF0-based descrambling used for the $2^{nd}$ DRS subframe in SF0. So, in either case, the scrambling/descrambling of the CSI-RS(s) in one of the two DRS subframes will be aligned.

Figure 9:
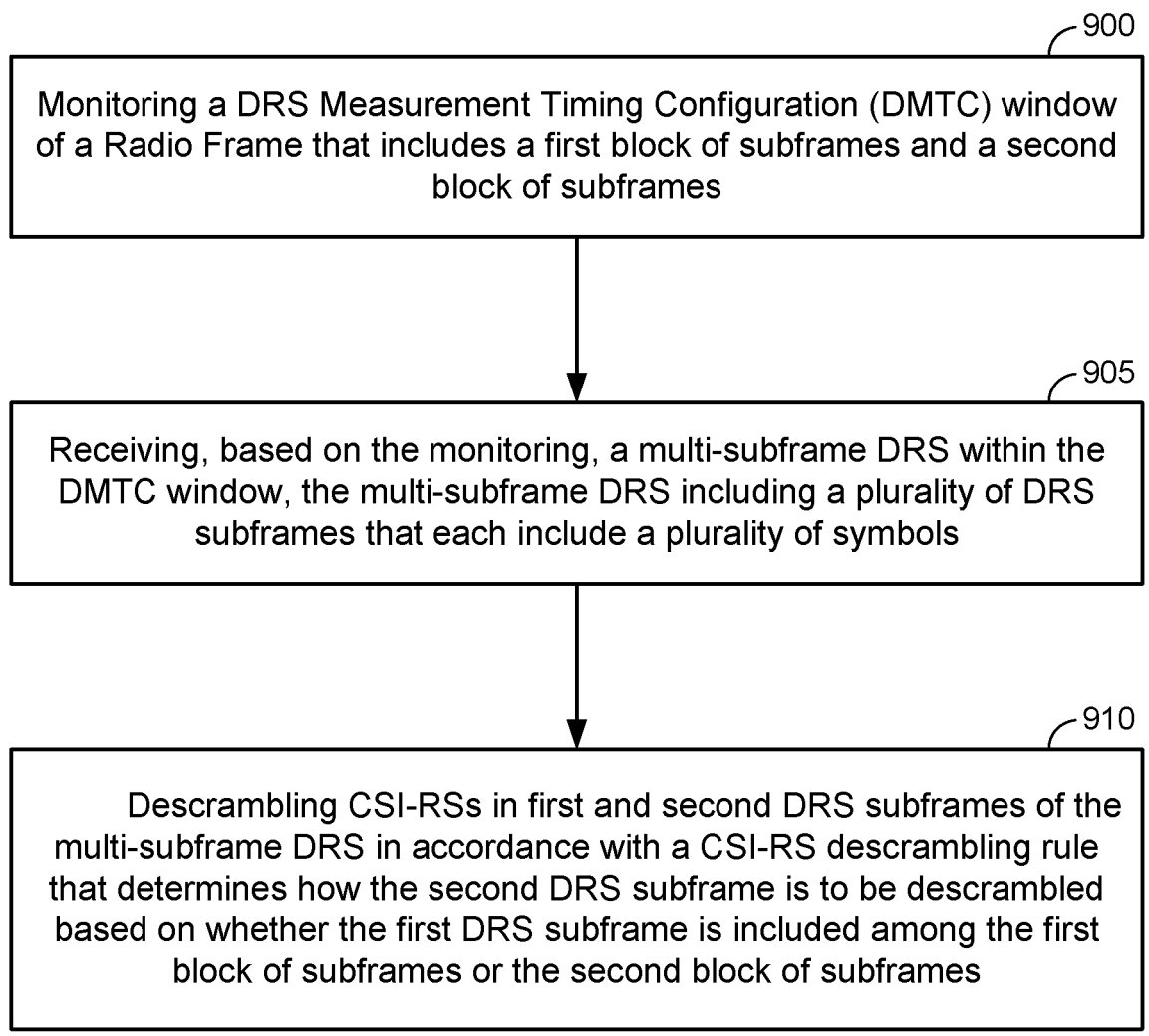
FIG. 9 illustrates a process of obtaining CSI-RSs in accordance with an embodiment of the disclosure.

FIG. 9 illustrates a process of obtaining CSI-RSs in accordance with an embodiment of the disclosure. The process of FIG. 9 may be implemented at an access terminal, such as the access terminal 120 in an example. In an example, the process of FIG. 9 may be performed at the access terminal in conjunction with any of the processes of FIGS. 6-8 being executed at the access point.

Referring to FIG. 9, at block 900, the access terminal monitors a DMTC window of a Radio Frame that includes a first block of subframes (e.g., SF0-SF4) and a second block of subframes (e.g., SF5-SF9). At block 905, the access terminal receives, based on the monitoring, a multi-subframe DRS within the DMTC window, the multi-subframe DRS including a plurality of DRS subframes that each include a plurality of symbols. At block 910, the access terminal descrambles CSI-RSs in first and second DRS subframes of the multi-subframe DRS in accordance with a CSI-RS descrambling rule that determines how the second DRS subframe is to be descrambled based on whether the first DRS subframe is included among the first block or subframes or the second block of subframes.

In an example, the CSI-RS descrambling rule is configured to as to be in alignment with the CSI-RS scrambling rule implemented at the access point (e.g., at block 610 of FIG. 6, etc.) so as to avoid a scrambling mismatch. Hence, for the sake of brevity, a relisting of the various scrambling/descrambling options described above with respect to FIGS. 6-9 is omitted here, as it is understood that any of the above-noted CSI-RS scrambling rules may be mapped to a corresponding CSI-RS descrambling rule at block 910 of FIG. 9.

Figure 10:
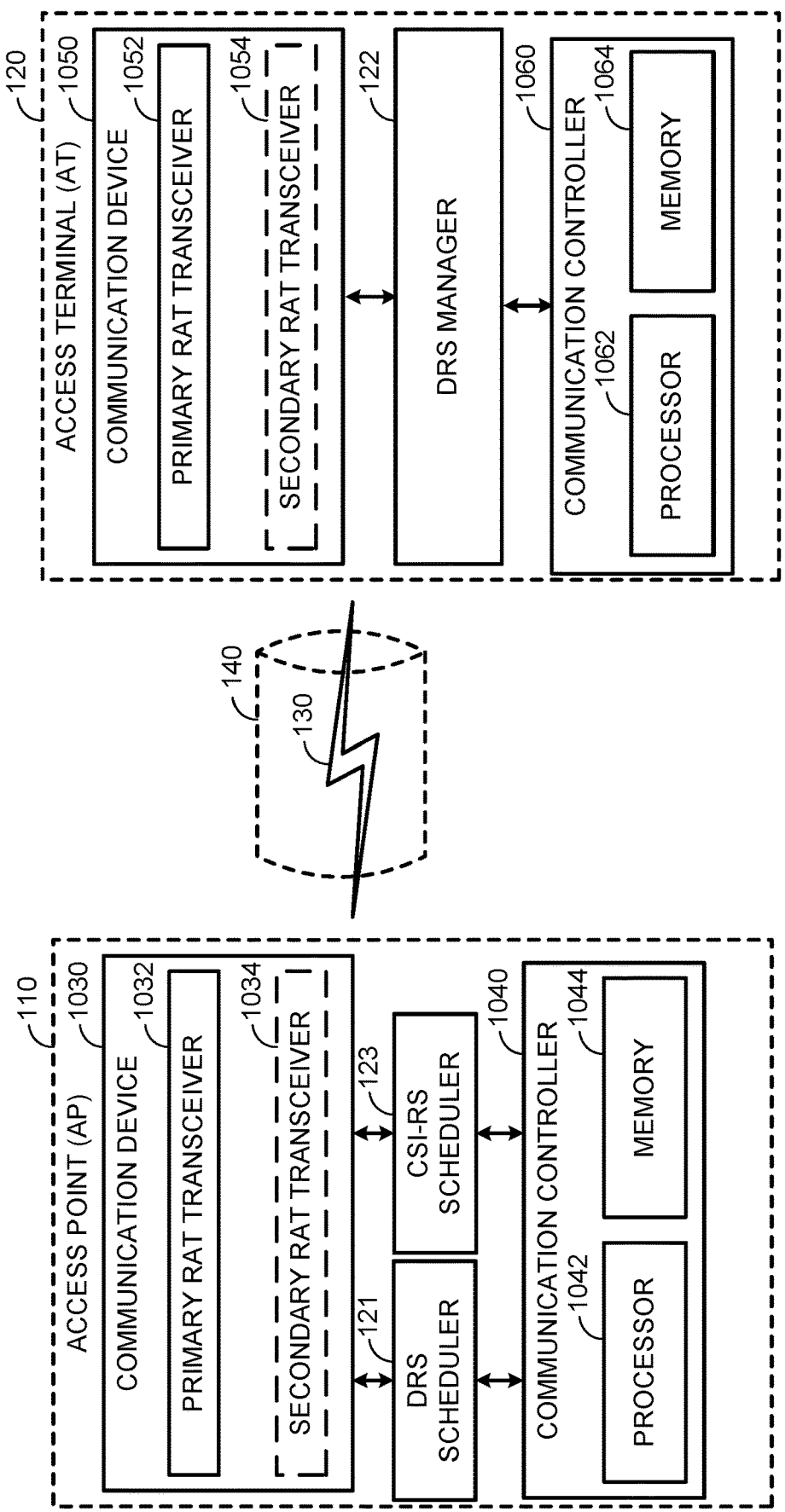
FIG. 10 is a device-level diagram illustrating example components of the access point and the access terminal of the primary RAT system of FIG. 1 in more detail.

FIG. 10 is a device-level diagram illustrating example components of the access point 110 and the access terminal 120 of the primary RAT system 100 in more detail. As shown, the access point 110 and the access terminal 120 may each generally include a wireless communication device (represented by the communication devices 1030 and 1050) for communicating with other wireless nodes via at least one designated RAT. The communication devices 1030 and 1050 may be variously configured for transmitting and encoding signals, and, conversely, for receiving and decoding signals in accordance with the designated RAT (e.g., messages, indications, information, pilots, and so on).

The communication devices 1030 and 1050 may include, for example, one or more transceivers, such as respective primary RAT transceivers 1032 and 1052, and, in some designs, (optional) co-located secondary RAT transceivers 1034 and 1054, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 1040 and 1060) for controlling operation of their respective communication devices 1030 and 1050 (e.g., directing, modifying, enabling, disabling, etc.). The communication controllers 1040 and 1060 may include one or more processors 1042 and 1062, and one or more memories 1044 and 1064 coupled to the processors 1042 and 1062, respectively. The memories 1044 and 1064 may be configured to store data, instructions, or a combination thereof, either as on-board cache memory, as separate components, a combination, etc. The processors 1042 and 1062 and the memories 1044 and 1064 may be standalone communication components or may be part of the respective host system functionality of the access point 110 and the access terminal 120.

It will be appreciated that the DRS scheduler 121 may be implemented in different ways. In some designs, some or all of the functionality associated therewith may be implemented by or otherwise at the direction of at least one processor (e.g., one or more of the processors 1042), at least one memory (e.g., one or more of the memories 1044), at least one transceiver (e.g., one or more of the transceivers 1032 and 1034), or a combination thereof. In other designs, some or all of the functionality associated therewith may be implemented as a series of interrelated functional modules.

It will be appreciated that the DRS manager 122 may be implemented in different ways. In some designs, some or all of the functionality associated therewith may be implemented by or otherwise at the direction of at least one processor (e.g., one or more of the processors 1062), at least one memory (e.g., one or more of the memories 1064), at least one transceiver (e.g., one or more of the transceivers 1052 and 1054), or a combination thereof. In other designs, some or all of the functionality associated therewith may be implemented as a series of interrelated functional modules.

It will be appreciated that the CSI-RS scheduler 123 may be implemented in different ways. In some designs, some or all of the functionality associated therewith may be implemented by or otherwise at the direction of at least one processor (e.g., one or more of the processors 1042), at least one memory (e.g., one or more of the memories 1044), at least one transceiver (e.g., one or more of the transceivers 1032 and 1034), or a combination thereof. In other designs, some or all of the functionality associated therewith may be implemented as a series of interrelated functional modules.

Accordingly, it will be appreciated that the components in FIG. 10 may be used to perform operations described above with respect to FIGS. 1-8.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of configuring channel state information reference signals (CSI-RSs) on a shared communication medium, comprising:

executing a Clear Channel Assessment (CCA) protocol to determine whether to begin transmission within a Discovery Reference Signaling (DRS) Measurement Timing Configuration (DMTC) window of a Radio Frame that includes a first block of subframes and a second block of subframes;

transmitting, based on the executing, a multi-subframe DRS within the DMTC window, the multi-subframe DRS including a plurality of DRS subframes that each include a plurality of symbols; and scrambling CSI-RSs in first and second DRS subframes of the multi-subframe DRS in accordance with a CSI-RS scrambling rule that determines that the second DRS subframe is to be scrambled with a first scrambling if the first DRS subframe is included among the first block of subframes and that the second DRS subframe is to be scrambled with a second scrambling that is different than the first scrambling if the first DRS subframe is included among the second block of subframes.

2. The method of claim 1,
wherein the first DRS subframe is included among the first block of subframes, and
wherein, based on the CSI-RS scrambling rule, the scrambling scrambles the second DRS subframe in accordance with scrambling that is defined for an initial block of the first block of subframes.

3. The method of claim 1,
wherein the first DRS subframe is included among the second block of subframes, and
wherein, based on the CSI-RS scrambling rule, the scrambling scrambles the second DRS subframe in accordance with scrambling that is defined for an initial block of the second block of subframes.

4. The method of claim 1, wherein the CSI-RS scrambling rule is a fixed CSI-RS scrambling rule that uses the same scrambling for both the first and second DRS subframes.

5. The method of claim 1,
wherein the first DRS subframe is transmitted on an initial block of the first block of subframes,
wherein the second DRS subframe is transmitted on a second block of the first block of subframes, and
wherein, based on the CSI-RS scrambling rule, the scrambling scrambles the second DRS subframe in accordance with scrambling that is defined for an initial block of the second block of subframes.

6. The method of claim 1,
wherein the first DRS subframe is transmitted on an initial block of the second block of subframes,
wherein the second DRS subframe is transmitted on a second block of the second block of subframes, and
wherein, based on the CSI-RS scrambling rule, the scrambling scrambles the second DRS subframe in accordance with scrambling that is defined for an initial block of the first block of subframes.

7. The method of claim 1, wherein the CCA protocol is Listen Before Talk (LBT) Category 4.

8. The method of claim 1, wherein the multi-subframe DRS comprises three or more DRS subframes.

9. A method of obtaining channel state information reference signals (CSI-RSs) on a shared communication medium, comprising:
monitoring a Discovery Reference Signaling (DRS) Measurement Timing Configuration (DMTC) window of a Radio Frame that includes a first block of subframes and a second block of subframes;
receiving, based on the monitoring, a multi-subframe DRS within the DMTC window, the multi-subframe DRS including a plurality of DRS subframes that each include a plurality of symbols; and
descrambling CSI-RSs in first and second DRS subframes of the multi-subframe DRS in accordance with a CSI-RS descrambling rule that determines that the second DRS subframe is to be descrambled with a first descrambling if the first DRS subframe is included among the first block of subframes and that is to be descrambled with a second descrambling that is different than the first descrambling if the first DRS subframe is included among the second block of subframes.

10. The method of claim 9,
wherein the first DRS subframe is included among the first block of subframes, and
wherein, based on the CSI-RS descrambling rule, the descrambling descrambles the second DRS subframe in accordance with descrambling that is defined for an initial block of the first block of subframes.

11. The method of claim 9,
wherein the first DRS subframe is included among the second block of subframes, and
wherein, based on the CSI-RS descrambling rule, the descrambling descrambles the second DRS subframe in accordance with descrambling that is defined for an initial block of the second block of subframes.

12. The method of claim 9, wherein the CSI-RS descrambling rule is a fixed CSI-RS descrambling rule that uses the same descrambling for both the first and second DRS subframes.

13. The method of claim 9,
wherein the first DRS subframe is received on an initial block of the first block of subframes,
wherein the second DRS subframe is received on a second block of the first block of subframes, and
wherein, based on the CSI-RS descrambling rule, the descrambling descrambles the second DRS subframe in accordance with descrambling that is defined for an initial block of the second block of subframes.

14. The method of claim 9,
wherein the first DRS subframe is received on an initial block of the second block of subframes,
wherein the second DRS subframe is received on a second block of the second block of subframes, and
wherein, based on the CSI-RS descrambling rule, the descrambling descrambles the second DRS subframe in accordance with descrambling that is defined for an initial block of the first block of subframes.

15. The method of claim 9, wherein the CCA protocol is Listen Before Talk (LBT) Category 4.

16. The method of claim 9, wherein the multi-subframe DRS comprises three or more DRS subframes.

17. An access point for configuring channel state information reference signals (CSI-RSs) on a shared communication medium, comprising:
means for executing a Clear Channel Assessment (CCA) protocol to determine whether to begin transmission within a Discovery Reference Signaling (DRS) Measurement Timing Configuration (DMTC) window of a Radio Frame that includes a first block of subframes and a second block of subframes;
means for transmitting, based on the executing, a multi-subframe DRS within the DMTC window, the multi-subframe DRS including a plurality of DRS subframes that each include a plurality of symbols; and
means for scrambling CSI-RSs in first and second DRS subframes of the multi-subframe DRS in accordance with a CSI-RS scrambling rule that determines that the second DRS subframe is to be scrambled with a first scrambling if the first DRS subframe is included among the first block of subframes and that the second DRS subframe is to be scrambled with a second scrambling that is different than the first scrambling if the first DRS subframe is included among the second block of subframes.

18. The access point of claim 17, wherein the CSI-RS scrambling rule is a fixed CSI-RS scrambling rule that uses the same scrambling for both the first and second DRS subframes.

19. A user equipment (UE) configured to obtain channel state information reference signals (CSI-RSs) on a shared communication medium, comprising:
means for monitoring a Discovery Reference Signaling (DRS) Measurement Timing Configuration (DMTC)

window of a Radio Frame that includes a first block of subframes and a second block of subframes;

means for receiving, based on the monitoring, a multi-subframe DRS within the DMTC window, the multi-subframe DRS including a plurality of DRS subframes that each include a plurality of symbols; and means for descrambling CSI-RSs in first and second DRS subframes of the multi-subframe DRS in accordance with a CSI-RS descrambling rule that determines that the second DRS subframe is to be descrambled with a first descrambling if the first DRS subframe is included among the first block of subframes and that is to be descrambled with a second descrambling that is different than the first descrambling if the first DRS subframe is included among the second block of subframes.

20. The UE of claim 19, wherein the CSI-RS scrambling rule is a fixed CSI-RS scrambling rule that uses the same scrambling for both the first and second DRS subframes.

21. An access point for configuring channel state information reference signals (CSI-RSs) on a shared communication medium, comprising:
a memory;
at least one transceiver; and
at least one processor coupled to the memory and the at least one transceiver and configured to:
execute a Clear Channel Assessment (CCA) protocol to determine whether to begin transmission within a Discovery Reference Signaling (DRS) Measurement Timing Configuration (DMTC) window of a Radio Frame that includes a first block of subframes and a second block of subframes;
transmit, based on the execution, a multi-subframe DRS within the DMTC window, the multi-subframe DRS including a plurality of DRS subframes that each include a plurality of symbols; and
scramble CSI-RSs in first and second DRS subframes of the multi-subframe DRS in accordance with a CSI-RS scrambling rule that determines that the second DRS subframe is to be scrambled with a first scrambling if the first DRS subframe is included among the first block of subframes and that the second DRS subframe is to be scrambled with a second scrambling that is different than the first scrambling if the first DRS subframe is included among the second block of subframes.

22. The access point of claim 21, wherein the CSI-RS scrambling rule is a fixed CSI-RS scrambling rule that uses the same scrambling for both the first and second DRS subframes.

23. A user equipment (UE) configured to obtain channel state information reference signals (CSI-RSs) on a shared communication medium, comprising:
a memory;
at least one transceiver; and
at least one processor coupled to the memory and the at least one transceiver and configured to:
monitor a Discovery Reference Signaling (DRS) Measurement Timing Configuration (DMTC) window of a Radio Frame that includes a first block of subframes and a second block of subframes;
receive, based on the monitoring, a multi-subframe DRS within the DMTC window, the multi-subframe DRS including a plurality of DRS subframes that each include a plurality of symbols; and
descramble CSI-RSs in first and second DRS subframes of the multi-subframe DRS in accordance with a CSI-RS descrambling rule that determines how the second DRS subframe is to be descrambled based on whether the first DRS subframe is included among the first block of subframes or the second block of subframes.

24. The access point of claim 23, wherein the CSI-RS scrambling rule is a fixed CSI-RS scrambling rule that uses the same scrambling for both the first and second DRS subframes.

25. A non-transitory computer-readable medium containing instructions stored thereon, which, when executed by an access point for configuring channel state information reference signals (CSI-RSs) on a shared communication medium, cause the access point to perform operations, the instructions comprising:
at least one instruction to cause the access point to execute a Clear Channel Assessment (CCA) protocol to determine whether to begin transmission within a Discovery Reference Signaling (DRS) Measurement Timing Configuration (DMTC) window of a Radio Frame that includes a first block of subframes and a second block of subframes;
at least one instruction to cause the access point to transmit, based on the execution, a multi-subframe DRS within the DMTC window, the multi-subframe DRS including a plurality of DRS subframes that each include a plurality of symbols; and
at least one instruction to cause the access point to scramble CSI-RSs in first and second DRS subframes of the multi-subframe DRS in accordance with a CSI-RS scrambling rule that determines that the second DRS subframe is to be scrambled with a first scrambling if the first DRS subframe is included among the first block of subframes and that the second DRS subframe is to be scrambled with a second scrambling that is different than the first scrambling if the first DRS subframe is included among the second block of subframes.

26. The non-transitory computer-readable medium of claim 25, wherein the CSI-RS scrambling rule is a fixed CSI-RS scrambling rule that uses the same scrambling for both the first and second DRS subframes.

27. A non-transitory computer-readable medium containing instructions stored thereon, which, when executed by a user equipment (UE) configured to obtain channel state information reference signals (CSI-RSs) on a shared communication medium, cause the access point to perform operations, the instructions comprising:
at least one instruction to cause the UE to monitor a Discovery Reference Signaling (DRS) Measurement Timing Configuration (DMTC) window of a Radio Frame that includes a first block of subframes and a second block of subframes;
at least one instruction to cause the UE to receive, based on the monitoring, a multi-subframe DRS within the DMTC window, the multi-subframe DRS including a plurality of DRS subframes that each include a plurality of symbols; and
at least one instruction to cause the UE to descramble CSI-RSs in first and second DRS subframes of the multi-subframe DRS in accordance with a CSI-RS descrambling rule that determines that the second DRS subframe is to be descrambled with a first descrambling if the first DRS subframe is included among the first block of subframes and that is to be descrambled with a second descrambling that is different than the first descrambling if the first DRS subframe is included among the second block of subframes.

28. The non-transitory computer-readable medium of claim 27, wherein the CSI-RS scrambling rule is a fixed CSI-RS scrambling rule that uses the same scrambling for both the first and second DRS subframes.

\* \* \* \* \*